(12) United States Patent
Savord

(10) Patent No.: US 6,241,676 B1
(45) Date of Patent: Jun. 5, 2001

(54) ULTRASOUND TRANSMIT WAVEFORMS HAVING LOW HARMONIC CONTENT

(75) Inventor: Bernard J Savord, Andover, MA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/329,409

(22) Filed: Jun. 10, 1999

(51) Int. Cl.7 .................................................. A61B 08/00
(52) U.S. Cl. .......................................................... 600/447
(58) Field of Search .......................... 680/447; 600/443, 600/437, 448, 458, 447

(56) References Cited

U.S. PATENT DOCUMENTS

| | | | |
|---|---|---|---|
| 5,675,554 | 10/1997 | Cole et al. | 367/138 |
| 5,740,128 | 4/1998 | Hossack et al. | 367/138 |
| 5,833,614 * | 11/1998 | Dodd et al. | 600/447 |
| 5,902,243 * | 5/1999 | Holley et al. | 600/443 |
| 5,913,823 * | 6/1999 | Hedberg et al. | 600/443 |
| 6,010,456 * | 1/2000 | Rhyne | 600/447 |
| 6,117,082 * | 9/2000 | Bradley et al. | 600/447 |

* cited by examiner

Primary Examiner—Marvin M. Lateef
Assistant Examiner—Maulin Patel

(57) ABSTRACT

Methods and apparatus for transmitting ultrasound energy having low harmonic content and for detecting harmonic reflections of the ultrasound energy are disclosed. According to the invention, the capacitance of an ultrasound transducer element, as well as any interconnection capacitance associated with one or more signal conductors attached to the transducer element, is utilized as part of a filter which conditions one or more electronic drive signals to provide an ultrasound transmit waveform having low harmonic content. Such a low harmonic content ultrasound transmit waveform may be used to expose a region of interest in a patient which reflects harmonics of the transmit waveform. Receive circuitry detects the harmonic reflections and generates an ultrasound image having improved contrast and reduced distortion.

24 Claims, 14 Drawing Sheets

ULTRASOUND TRANSMIT WAVEFORMS HAVING LOW HARMONIC CONTENT

FIELD OF THE INVENTION

This invention relates to harmonic ultrasound imaging for medical applications and, more particularly, to methods and apparatus for transmitting ultrasound energy having waveforms with low harmonic content and for detecting harmonic reflections of the ultrasound energy.

BACKGROUND OF THE INVENTION

Ultrasound imaging systems for medical applications typically employ an array of individual ultrasound transducer elements which transmit and receive ultrasound energy. The transducer array transmits ultrasound energy into a region of interest in a patient, and receives reflected ultrasound energy, or echos, from various structures and organs within the patient's body. The imaging system then processes electronic signals generated by the elements of the transducer array, based on the received ultrasound energy, to form an image of the region of interest.

Some ultrasound imaging applications make use of harmonic reflections from a region of interest for which an image may be desired. Harmonic reflections may result from a non-linear medium that is exposed to ultrasound energy at some fundamental transmit frequency. One example of such a non-linear medium includes water, which is present throughout body tissues and has different expansion and compression properties upon exposure to ultrasound energy. In this manner, non-linear body tissues and fluids may release acoustic energy at one or more harmonic frequencies of the fundamental transmit frequency of the ultrasound energy to which they are exposed.

Contrast agents provide another example of a non-linear medium used in some ultrasound imaging applications. Non-linear contrast agents may be introduced into regions of interest in a patient, for example, into the blood stream or body tissues, to highlight these regions from surrounding tissue in the ultrasound image. These agents generally have stronger non-linear properties than the surrounding tissues. Typically, contrast agents have a fundamental resonant frequency and radiate ultrasound energy at a particular harmonic frequency when exposed to high intensity ultrasound energy at the fundamental resonant frequency. An ultrasound imaging system may therefore identify and isolate regions containing a contrast agent by differentiating the ultrasound energy at the particular harmonic frequency associated with the contrast agent from harmonic ultrasound energy associated with the surrounding tissue.

Ultrasound imaging applications utilizing harmonic reflections from either body tissues and/or contrast agents may be limited, however, by the harmonic content of ultrasound energy transmitted to a region of interest. In particular, ultrasound transmit waveforms having a significant harmonic content may result in ultrasound images having undesired artifacts, as well as ultrasound images having reduced contrast between a contrast agent and surrounding tissues. Such artifacts or reduced contrast may be due to undesired high frequency components of the transmit waveform that interfere with desired harmonic reflections from the region of interest.

For example, to reach a region of interest for which an image may be desired, ultrasound energy must often pass through body structures and tissues, such as a chest wall, which include inhomogeneous materials that may significantly distort the waveform profile of ultrasound energy. This distortion from inhomogenous materials often results in unwanted artifacts in the resulting image. Since ultrasound waveform distortion from inhomogeneous materials is typically less at lower frequencies, it is advantageous to transmit ultrasound energy at a low fundamental frequency. However, lower frequency ultrasound energy generally results in lower resolution images.

To avoid a loss of resolution associated with lower frequencies, an ultrasound imaging system may detect harmonics reflected from any non-linear tissues being imaged, as discussed above. However, if the ultrasound transmit waveform itself includes a significant harmonic content, higher frequency components of the transmit waveform may not be discernible from the desired harmonic reflections. Moreover, distortion of the higher frequency components of the transmit waveform from inhomogeneous materials, notwithstanding the lower fundamental frequency, may contribute to unwanted artifacts in the resulting image.

In view of the foregoing, it is desirable to transmit ultrasound energy as a waveform having a fundamental frequency, wherein the waveform is substantially free of higher frequency harmonic components of the fundamental frequency, or has low harmonic content. Since higher frequencies experience greater distortion in inhomogeneous materials, as discussed above, reducing higher frequency components in an ultrasound transmit waveform in turn reduces distortion of the ultrasound energy as it passes through body structures and tissues that include inhomogeneous materials. By utilizing ultrasound transmit waveforms having low harmonic content, it is possible for ultrasound imaging systems to obtain clearer images having fewer artifacts from distortion. Additionally, ultrasound imaging applications utilizing low harmonic content ultrasound transmit waveforms and contrast agents benefit from a higher contrast ratio between the contrast agent and surrounding tissue.

In one known technique for reducing the harmonic content of an ultrasound transmit waveform, an electronic pulse generator supplies a burst of pulses having a fundamental frequency to a low pass filter. The duration of the pulses and the number of pulses in the burst are controllable and determine the resulting frequency spectrum of the burst. Such a burst of pulses has a primarily rectangular shape and has a frequency spectrum that includes a number of sidelobes having significant harmonic content. The low pass filter is typically designed as a Gaussian, Bessel or Chebyshev filter to substantially eliminate energy at a particular harmonic frequency from the burst of pulses. The filtered burst of pulses is then applied to ultrasound transducer elements which transmit ultrasound energy having a waveform similar to that of the filtered burst of pulses.

Other proposed techniques for reducing the harmonic content of ultrasound transmit waveforms include using digital signal processing methods and apparatus, such as digital programmable waveform generators, to produce particularly shaped electronic waveforms having low harmonic content, which are then applied to ultrasound transducer elements. Such techniques typically involve synthesizing an electronic signal having a particularly shaped amplitude envelope which includes several cycles of a fundamental or "carrier" frequency. A variety of such electronic signals having frequency spectra that exhibit "sidelobe suppression," or low harmonic content, may be custom synthesized using digital signal processing methods and apparatus.

In one such technique described in Hossack, et al., U.S. Pat. No. 5,740,128, a desired frequency spectrum for an ultrasound transmit waveform is designed on a computer, and an inverse fast Fourier transform is performed to synthesize a corresponding time domain waveform. The synthesized waveform may be specifically designed to suppress ultrasound energy in a wide band around a particular harmonic frequency. A digital representation of the synthesized waveform is stored in memory, and is applied to a digital-to-analog converter which provides an analog electronic signal of the stored waveform. This analog signal may optionally be passed through a low pass analog filter, such as a Gaussian, Bessel filter or a Chebyshev filter, to further reduce any undesirable high frequency components of the analog signal. This low harmonic content electronic signal is then applied to ultrasound transducer elements to provide ultrasound energy having low harmonic content.

One consequence of the techniques described above is that a significant amount of space is required for the electronic circuitry, for example, the analog filters or any digital signal processing electronics, such as a computer or programmable waveform generator, memory, and digital-to-analog converters, which provide the low harmonic content electronic signal applied to the ultrasound transducer elements. Accordingly, a method and apparatus for transmitting ultrasound energy having low harmonic content is desirable that uses fewer electronic components and requires less space than other proposed techniques.

SUMMARY OF THE INVENTION

The present invention is directed to methods and apparatus for transmitting ultrasound energy having low harmonic content and for receiving harmonic reflections. The methods and apparatus of the invention are simplified with respect to previous solutions for reducing harmonic content in ultrasound transmit waveforms, as discussed above. According to one aspect of the invention, the capacitance of an ultrasound transducer element, as well as any interconnection capacitance associated with one or more signal conductors attached to the transducer element, is utilized as part of a filter that conditions one or more electronic drive signals to provide an ultrasound transmit waveform having low harmonic content. An electronic drive signal input to the filter to drive the ultrasound transducer element may itself have an appreciable harmonic content. This is in contrast to prior art techniques for reducing ultrasound transmit waveform harmonic content, which use pre-filtered and/or synthesized low harmonic content electronic signals to drive an ultrasound transducer element. Additionally, in one aspect, an apparatus according to the invention may be fabricated as a monolithic integrated circuit. In this manner, the methods and apparatus of the invention facilitate the generation of ultrasound energy having low harmonic content and detection of harmonic reflections by using fewer components and circuitry and requiring less space than previous solutions.

In one embodiment, an apparatus according to the invention includes an ultrasound transducer element to output ultrasound energy having an ultrasound transmit waveform with a low harmonic content, wherein the ultrasound transducer element has a capacitance. The apparatus further includes a transducer driver to charge and discharge the ultrasound transducer element based on at least one drive signal input to the transducer driver, wherein the at least one drive signal has a fundamental frequency. The transducer driver charges and discharges the ultrasound transducer element such that the ultrasound transmit waveform has a rise time based on the capacitance and one of an output impedance of the transducer driver and a drive current output by the transducer driver, the one of the output impedance and the drive current being selected such that the rise time is greater than one-fifth of a period given by a reciprocal of the fundamental frequency.

In one aspect, the fundamental frequency of the drive signal is less than 3.5 MHZ.

In another aspect, the apparatus further includes receive circuitry to detect a reflected ultrasound waveform at a harmonic frequency of the fundamental frequency.

In another aspect, the drive signal has a drive signal harmonic content, and the low harmonic content is substantially less than the drive signal harmonic content.

In another aspect, the apparatus further includes at least one signal conductor electrically connected to the ultrasound transducer element and the transducer driver, wherein the at least one signal conductor has an interconnection capacitance. The interconnection capacitance and the capacitance of the ultrasound transducer element form a combined capacitance, and the rise time is based on the combined capacitance and the one of the output impedance and the drive current.

In another aspect, the transducer driver comprises a controllable voltage source having the output impedance, the controllable voltage source and the ultrasound transducer element form a filter having a cutoff frequency based on the combined capacitance and the output impedance, and the output impedance is selected such that the cutoff frequency is less than a predetermined harmonic frequency of the fundamental frequency.

In another aspect, the predetermined harmonic frequency is the second harmonic frequency.

In another aspect, the transducer driver comprises a controllable switched current source including at least one of a charge circuit and a discharge circuit to output the drive current to the ultrasound transducer element based on the drive signal, and the drive signal includes digital pulse control signals to control at least one of the charge circuit and the discharge circuit.

In another aspect, the digital pulse control signals control the controllable switched current source such that at least one of the charge circuit and the discharge circuit outputs at least two different current values for the drive current.

In another aspect, the charge circuit comprises a plurality of first current sources having a first common terminal controlled by a charge control input, at least one of the first current sources having a second terminal controlled by a first auxiliary control input. The discharge circuit comprises a plurality of second current sources having a first common terminal controlled by a discharge control input, at least one of the second current sources having a second terminal controlled by a second auxiliary control input. The digital pulse control signals are applied to the charge control input, the discharge control input, the first auxiliary control input, and the second auxiliary control input in a predetermined manner to control the plurality of first controllable current sources and the plurality of second controllable current sources to output the drive current.

In another aspect, the ultrasound transmit waveform is a substantially triangular waveform.

In another aspect, the ultrasound transmit waveform comprises at least a first slope and a second slope, the first and second slopes being based on the combined capacitance and the drive current, the first slope having a different magnitude than the second slope.

In another aspect, the ultrasound transmit waveform comprises at least two unique maxima.

In another aspect, the apparatus is fabricated as a monolithic integrated circuit.

In another embodiment, an apparatus according to the invention comprises a plurality of ultrasound transducer elements, each transducer element having a transducer impedance based on a capacitance of the transducer element, and a corresponding plurality of programmable-delay switched current sources to charge and discharge the plurality of ultrasound transducer elements in a selectable manner, each programmable-delay current source outputting a drive current to charge and discharge a respective ultrasound transducer element so as to transmit ultrasound energy having an ultrasound transmit waveform based on the drive current and the transducer impedance, wherein the ultrasound transmit waveform has a low harmonic content. The apparatus further comprises a transducer controller to output common control signals to the plurality of programmable-delay current sources, wherein the ultrasound transmit waveform transmitted by each transducer element is based on selectably delayed versions of the common control signals.

In one aspect, each programmable-delay current source comprises a charge circuit to charge the respective transducer element, a discharge circuit to discharge the respective transducer element, and at least one programmable delay circuit to receive the common control signals and delay instruction signals, and to output the selectably delayed versions of the common control signals to the charge circuit and the discharge circuit, based on the delay instruction signals.

In another aspect, the plurality of programmable-delay current sources and the transducer controller are fabricated as a monolithic integrated circuit.

In another embodiment, a method according to the invention for transmitting ultrasound energy having a low harmonic content ultrasound transmit waveform comprises a step of charging and discharging an ultrasound transducer element using one of a drive voltage applied to the ultrasound transducer element through a drive impedance and a drive current, the drive voltage and the drive current each having a fundamental frequency, the ultrasound transducer element having a capacitance. The method further comprises a step of selecting one of the drive impedance and the drive current such that the ultrasound transmit waveform has a rise time greater than one-fifth of a period given by a reciprocal of the fundamental frequency, the rise time being based on the capacitance and the one of the drive impedance and the drive current.

In one aspect of the method according to the invention, the step of charging and discharging comprises a step of charging and discharging the ultrasound transducer element such that the ultrasound transmit waveform is a complex waveform comprising a sequence of three triangular pulses, wherein a first and last triangular pulse of the sequence each has a first slope magnitude and a first maximum, and a middle triangular pulse of the sequence, occurring between the first and last triangular pulses, has a second slope magnitude greater than the first slope magnitude and a second maximum greater than the first maximum.

In another aspect of the method according to the invention, the step of charging and discharging comprises a step of applying digital pulse control signals having a pulse width to a switched current source to output the drive current, such that the ultrasound transmit waveform has a slope based on the capacitance and the drive current, and the rise time is comparable to the pulse width.

In another aspect, a first magnitude of the low harmonic content of the ultrasound transmit waveform is at least 20 decibels below a second magnitude of a drive current harmonic content of the drive current in a frequency band around a second harmonic frequency of the fundamental frequency.

Other advantages, novel features, and objects of the invention will be become apparent from the following detailed description of the invention when considered in conjunction with the accompanying drawings.

BRIEF DESCRIPTION OF THE DRAWINGS

The accompanying drawings, which are incorporated herein by reference, are not intended to be drawn to scale. In the drawings, each identical or nearly identical component that is illustrated in various figures is represented by a like numeral. For purposes of clarity, not every component may be labeled in every drawing, wherein.

DETAILED DESCRIPTION

Figure 1:
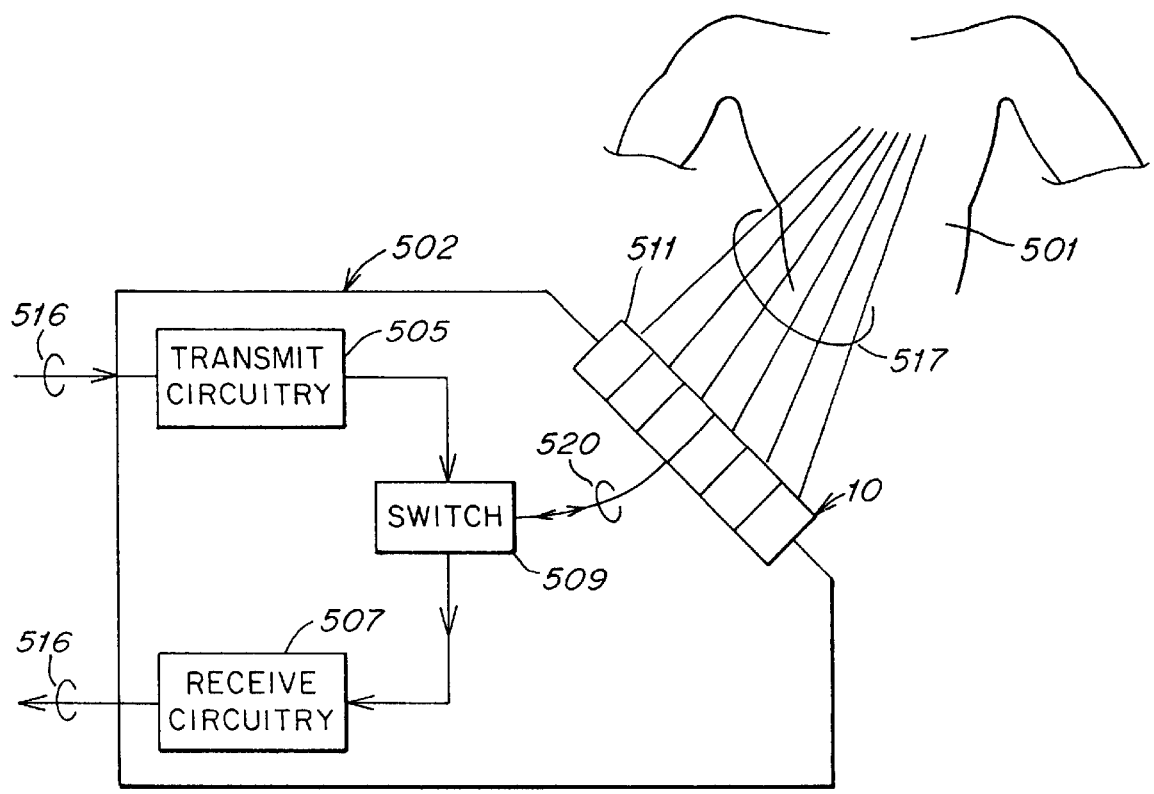
FIG. 1 is a diagram illustrating a portion of an ultrasound imaging system which includes an apparatus according to one embodiment of the invention.

FIG. 1 shows a portion of an ultrasound imaging system for medical applications which includes an apparatus according to one embodiment of the invention. In the system of FIG. 1, one or more arrays 511 of individual ultrasound transducer elements 10 transmit ultrasound energy 517 into a region of interest in a patient 501, and receive reflected ultrasound energy, or echos, from various structures and organs within the patient's body. Transmit circuitry 505 provides electronic signals to the transducer elements 10 of the array 511 to produce the ultrasound energy 517, and receive circuitry 507 processes electronic signals generated by the elements 10 based on the ultrasound energy reflected from the region of interest. The ultrasound energy transmitted by the transducer elements 10 may have a fundamental frequency, and the receive circuitry 507 may detect ultrasound energy reflected from the region of interest at one or more harmonic frequencies of the fundamental frequency.

As illustrated in FIG. 1, the ultrasound imaging system may include a transmit/receive switch 508 to alternately couple, via one or more signal conductors 520, the transmit circuitry 505 and the receive circuitry 507 to the transducer array 511 for respective transmit and receive operations. Alternatively, one group of transducer elements 10 or a transducer array similar to that of array 511, dedicated to transmitting ultrasound energy, may be connected directly to transmit circuitry 505, while another group of transducer elements 10 or another array similar to that of array 511, dedicated to receiving ultrasound energy, may be connected directly to receive circuitry 507. Additionally, transmit circuitry 505, receive circuitry 507, transducer array 511, and transmit/receive switch 509 may be located together in a single package 502, for example a hand-held transducer head which is connected by a flexible cable 516 to an electronics unit (not shown), and may be fabricated as a monolithic integrated circuit. The electronics unit controls the circuitry of the transducer head to form an image of the region of interest in the patient, based on the transmitted and reflected ultrasound energy.

The present invention utilizes the "clamp" capacitance of an ultrasound transducer element 10, as well as any interconnection capacitance between the transducer element and associated circuitry, as part of a "filter" that reduces the harmonic content of a waveform of ultrasound energy 517 transmitted by the transducer element. For example, such a filter may include a portion or all of the transmit circuitry 505, the transducer element 10, and one or more signal conductors 520, and may receive one or more electronic drive signals having a fundamental frequency and a particular frequency spectrum, or harmonic content. An exemplary range of fundamental frequencies of the drive signals suitable for purposes of the invention may given as, but is not limited to, 1 MHz to 10 MHz.

In the filter described above in connection with FIG. 1, the ultrasound transducer element 10 is capacitively charged and discharged through one or more signal conductors 520 by the transmit circuitry 505, based on the drive signals, and converts electrical energy from the drive signals into ultrasound energy 517 such that the ultrasound transmit waveform has low harmonic content. In particular, if the drive signals have an appreciable harmonic content, the ultrasound transmit waveform may have a harmonic content that is substantially less than the harmonic content of the drive signals. Such a low harmonic content ultrasound transmit waveform may be used to expose a region of interest in patient 501 that includes media, such as non-linear tissues and/or contrast agents, which reflect harmonics of the transmit waveform. Receive circuitry 507 may be used to detect such harmonic reflections and generate an ultrasound image of the region of interest having improved contrast and reduced distortion.

Figure 2A:
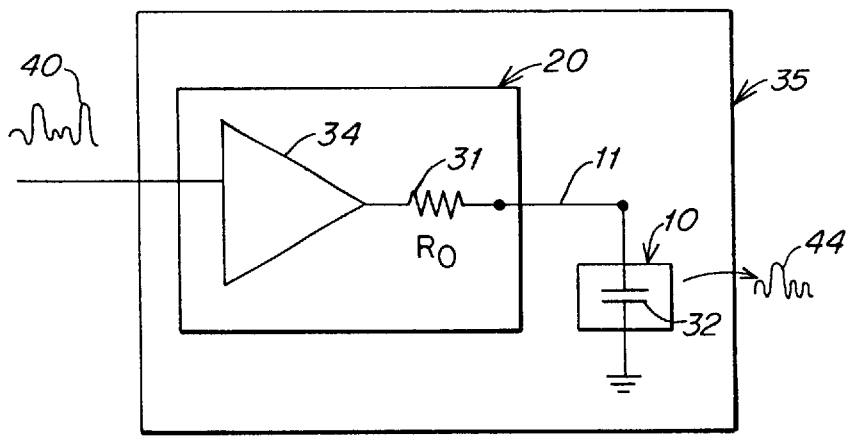
FIG. 2A is a diagram illustrating an apparatus according to one embodiment of the invention.

A simplified block diagram of an example of an apparatus for transmitting ultrasound energy having low harmonic content, according to one embodiment of the invention, is shown in FIG. 2A. The apparatus of FIG. 2A includes an ultrasound transducer element 10, a transducer driver 20, and a signal conductor 11 connecting the transducer element 10 and the transducer driver 20. The transducer driver 20 may be included as part of the transmit circuitry 504 of the ultrasound imaging system shown in FIG. 1, and the signal conductor 11 may be, for example, one of the signal conductors 514 shown in FIG. 1. FIG. 2A also shows a capacitance 32 associated with the transducer element 10 and the signal conductor 11. The capacitance 32 represents a combined capacitance based on a "clamp" capacitance of the ultrasound transducer element 10 and any interconnection capacitance associated with the signal conductor 11. For embodiments in which the interconnection capacitance may be negligible, the capacitance 32 represents primarily the capacitance of the ultrasound transducer element 10.

FIG. 2A shows that, in one embodiment of the invention, the transducer driver 20 may include a controllable voltage source 34 having an output impedance 31, shown symbolically in FIG. 2A as resistor $R_O$. In the apparatus of FIG. 2A, the controllable voltage source 34 charges and discharges the ultrasound transducer element 10 through the output impedance 31 and the signal conductor 11, based on one or more drive signals 40 input to the controllable voltage source 34. Accordingly, in the embodiment of FIG. 2A, the transducer driver 20 functions essentially as a "voltage mode" driver. As discussed above in connection with FIG. 1, the transducer element 10, the signal conductor 11, and the voltage mode transducer driver 20 including the output impedance 31 may be viewed as forming a filter 35 having a cutoff frequency based on the combined capacitance 32 and the output impedance 31.

The cutoff frequency of a filter generally refers to that frequency at which the magnitude of the output of the filter is attenuated by approximately 3 dB (approximately 30%) from some maximum value. For first-order low-pass linear filters such as filter 35, the cutoff frequency in Hz may be expressed in terms of a time constant $\tau$ as $1/(2\pi\tau)$, where for the filter 35 $\tau$ is given by the product of the output impedance 31 and the combined capacitance 32. An exemplary range of values for the capacitance 32 suitable for purposes of the invention includes, but is not limited to, 10 to 200 picofarads. Similarly, an exemplary range of output impedance values for the voltage mode transducer driver 20 suitable for purposes of the invention includes, but is not limited to, 500 ohms or greater.

In the embodiment of FIG. 2A, the value of the output impedance 31 may be selected and implemented during a fabrication process for the voltage mode transducer driver 20. In particular, the output impedance 31 may be selected such that the cutoff frequency of the filter 35 is less than a predetermined harmonic frequency of a fundamental frequency of one or more drive signals 40. For example, the output impedance 31 may be selected such that the cutoff frequency of filter 35 is less than a second harmonic frequency of the fundamental frequency of the drive signals 40. Accordingly, for drive signals 40 having an appreciable harmonic content, the harmonic content of the ultrasound transmit waveform 44 may be substantially less than the harmonic content of the drive signal.

Alternatively, the drive signal conditioning provided by the apparatus of FIG. 2A may be described in terms of a rise time of the ultrasound transmit waveform 44 output from the filter 35. The rise time of a waveform is commonly defined as the time in which the waveform changes from 10% to 90% of a span between a minimum and maximum value. In the apparatus of FIG. 2A, the ultrasound transmit waveform 44 has a rise time based on the combined transducer/signal conductor capacitance 32 and the output impedance 31 of the transducer driver 20. In a preferred embodiment, the rise time is greater than one-fifth of a period given by the reciprocal of the fundamental frequency of the drive signals 40.

Figure 2B:
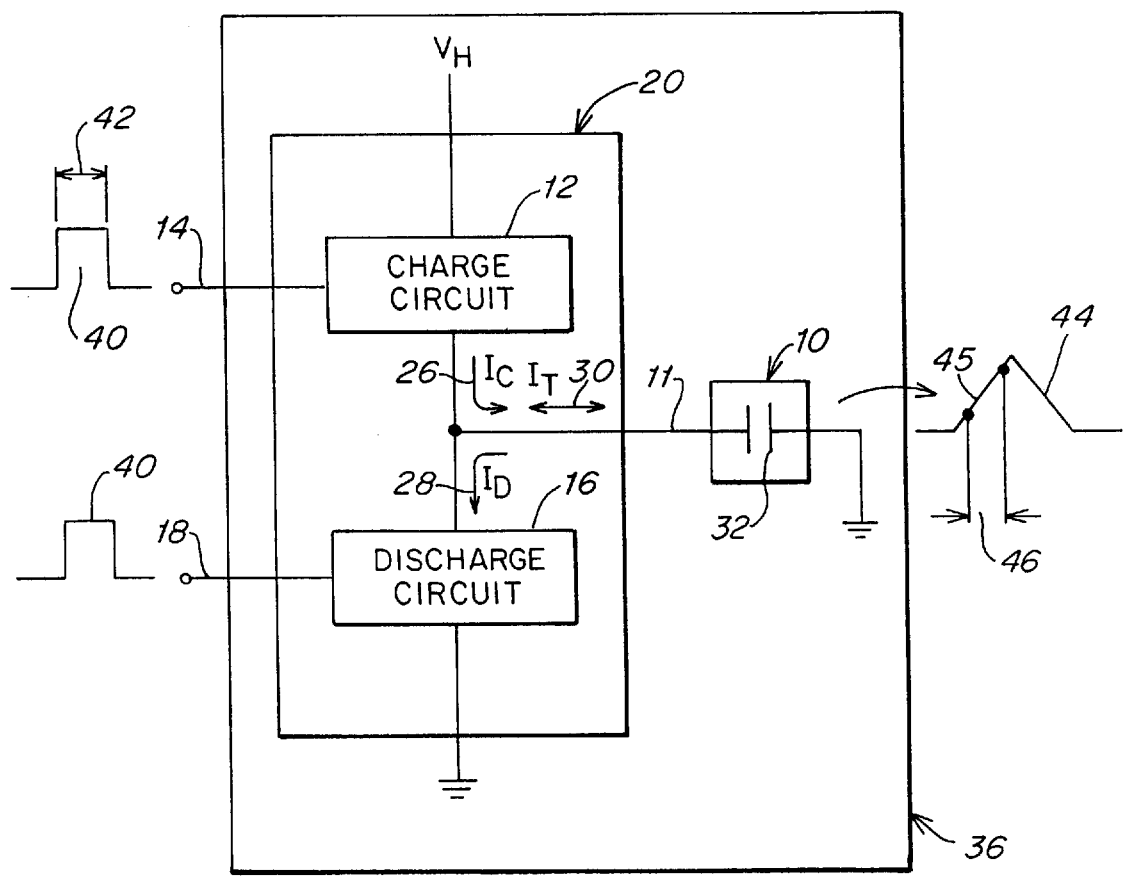
FIG. 2B is a diagram illustrating an apparatus according to another embodiment of the invention.

A simplified block diagram of an example of an apparatus for transmitting ultrasound energy having low harmonic content, according to another embodiment of the invention, is shown in FIG. 2B. In the apparatus of FIG. 2B, unlike the apparatus of FIG. 2A, the transducer driver 20 functions essentially as a "current mode" driver. For example, the transducer driver 20 of FIG. 2B may be a controllable switched current source having a high output impedance which approximates that of an ideal current source having a theoretically infinite output impedance. Similarly to the voltage mode transducer driver of FIG. 2A, the controllable switched current source transducer driver 20 of FIG. 2B may be included as part of the transmit circuitry 504 of the ultrasound imaging system shown in FIG. 1.

In FIG. 2B, the controllable switched current source transducer driver 20 is shown coupled between a supply voltage $V_H$, typically in a range of 10 to 200 volts, and ground. FIG. 2B also shows that the controllable switched current source 20 may include a charge circuit 12 to provide a charge current 26 ($I_c$) to the ultrasound transducer element 10 and a discharge circuit 16 to conduct a discharge current 28 ($I_D$) from the ultrasound transducer element 10. The charge circuit 12 may have a charge control input 14 and the discharge circuit 16 may have a discharge control input 18.

The charge circuit 12 and the discharge circuit 16 of FIG. 2B are electrically coupled to provide a drive current 30 ($I_T$) to the ultrasound transducer element 10. The drive current 30 is the sum of the charge current 26 and the discharge current 28 as a function of time. The charge control input 14 and the discharge control input 18 may receive one or more electronic drive signals 40 that determine the magnitudes of the charge current 26 and the discharge current 28 as a function of time and hence, determine the drive current 30.

FIG. 2B shows that the electronic drive signals received on control inputs 14 and 18 may be digital pulse control signals 40 having a pulse width 42. An exemplary range of digital control signal pulse widths suitable for purposes of the invention includes, but is not limited to, 50–200 nanoseconds. According to the embodiment of FIG. 2B, the digital pulse control signals 40 may control at least one of the charge circuit 12 and the discharge circuit 16 to output the drive current 30 such that the ultrasound transmit waveform 44 has a slope 45 based on the combined transducer/signal conductor capacitance 32 and the drive current 30. In this embodiment, the ultrasound transmit waveform 44 may have a rise time 46 comparable to the pulse width 42; namely, the rise time 46 and the pulse width 42 may have approximately the same order of magnitude.

In the apparatus of FIG. 2B, typically the amplitude of the digital pulse control signals 40 determines the magnitudes of the charge current 26 and the discharge current 28, and the pulse width 42 determines the duration of the charge current 26 and the discharge current 28. Additionally, the digital pulse control signals 40 are generally applied to control inputs 14 and 18 at different times in a predetermined manner and hence, only one of charge circuit 12 and discharge circuit 16 are operated at any given time. In this manner, the switched current source transducer driver 20 and the ultrasound transducer element 10 of FIG. 2B function together as a time-dependent filter 36.

As discussed above in connection with FIG. 2A, in a preferred embodiment the rise time of the ultrasound transmit waveform 44 is greater than one-fifth of a period given by the reciprocal of the fundamental frequency of the drive signals 40. Specifically, in the apparatus of FIG. 2B, the amplitude of the digital pulse control signals 40 may be selected and the control signals 40 may be applied to control inputs 14 and 18 in a predetermined manner such that the rise time 46 of the ultrasound transmit waveform 44 is greater than one-fifth of the pulse width 42.

In summary, each of the apparatus according to different embodiments of the invention shown in FIGS. 2A and 2B receives one or more electronic drive signals and conditions the drive signals to provide an ultrasound transmit waveform having low harmonic content by utilizing the capacitance of both an ultrasound transducer element and one or more signal conductors attached to the ultrasound transducer element as part of a filter. The apparatus according to the embodiment shown in FIG. 2A includes a "voltage mode" transducer driver, and the ultimate shape of the ultrasound transmit waveform is based on the combined transducer/signal conductor capacitance and an output impedance of the voltage mode transducer driver. The apparatus according to the embodiment shown in FIG. 2B includes a "current mode" transducer driver, and the ultimate shape of the ultrasound transmit waveform is based on the combined transducer/signal conductor capacitance and a drive current that charges and discharges the ultrasound transducer element.

It is noteworthy that, while prior art transducer drivers are typically designed to have low impedance outputs so as to avoid any deleterious effects on the ultrasound transmit waveform due to the inherent capacitance of the transducer element, the present invention advantageously utilizes the inherent transducer element capacitance and signal conductor capacitance, in combination with either a selected driver output impedance or a drive current provided by a current source having a high output impedance which approximates a theoretically infinite impedance, to provide low harmonic content ultrasound energy.

In both of the apparatus shown in FIGS. 2A and 2B, an electrical waveform is produced across the ultrasound transducer element 10 as a result of the charging and discharging of the transducer element due to either an applied voltage or current. The electrical energy of the electrical waveform is converted by the transducer element to ultrasound energy having an ultrasound transmit waveform 44 similar to that of the electrical waveform. In practice, the waveform 44 of ultrasound energy actually transmitted by the transducer element may not be exactly identical to the electrical waveform produced across the ultrasound transducer element and may have a slightly more "softened" or sinusoidal shape close to a waveform peak than that of the electrical waveform. This effect is primarily due to physical limitations of the transducer element, which mechanically vibrates in response to the electrical waveform to produced the ultrasound energy. Accordingly, such a waveform-softening effect may be more pronounced for electrical waveforms having sharp peaks, such as triangular waveforms. For purposes of the present discussion, however, the waveform-softening effect due to physical limitations of the transducer element is assumed to be negligible, and the harmonic content of the electrical waveform produced across the ultrasound transducer element 10 and the ultrasound transmit waveform 44 itself are assumed to be substantially similar.

Figure 3A:
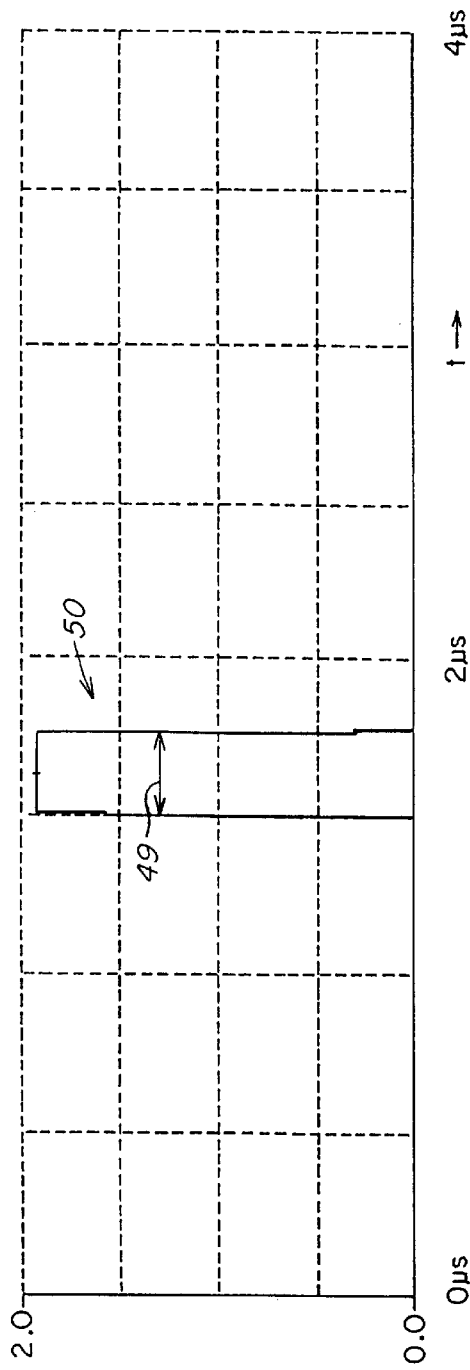
FIGS. 3A, 3B, 4A, and 4B are plots showing examples of known ultrasound transmit waveforms and the corresponding frequency spectra.
Figure 4A:
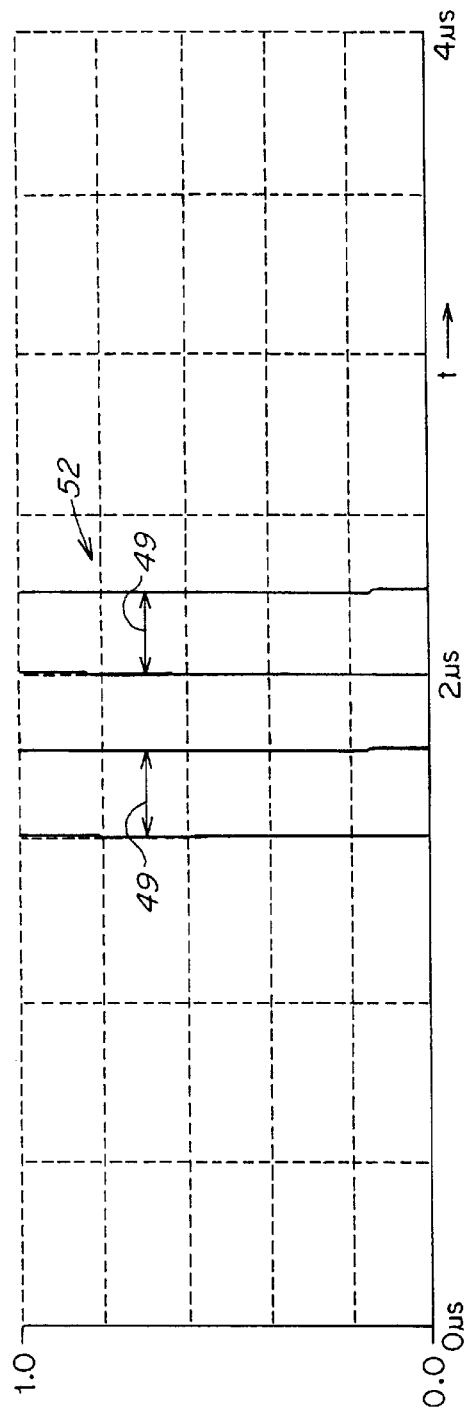
Figure 4B:
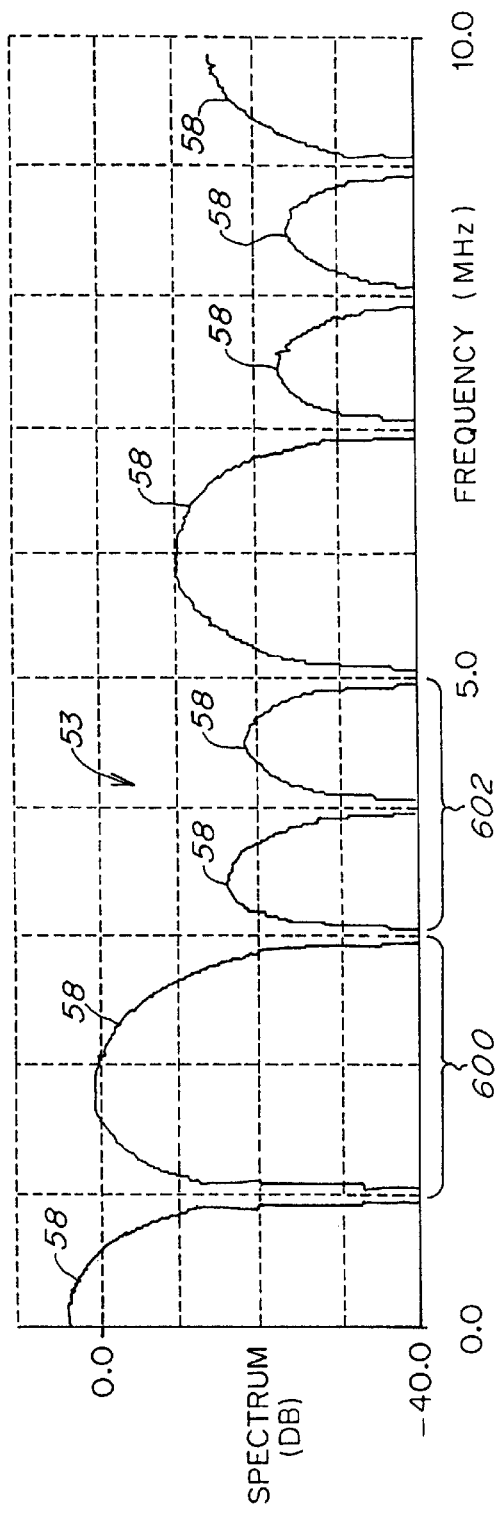
Figure 5A:
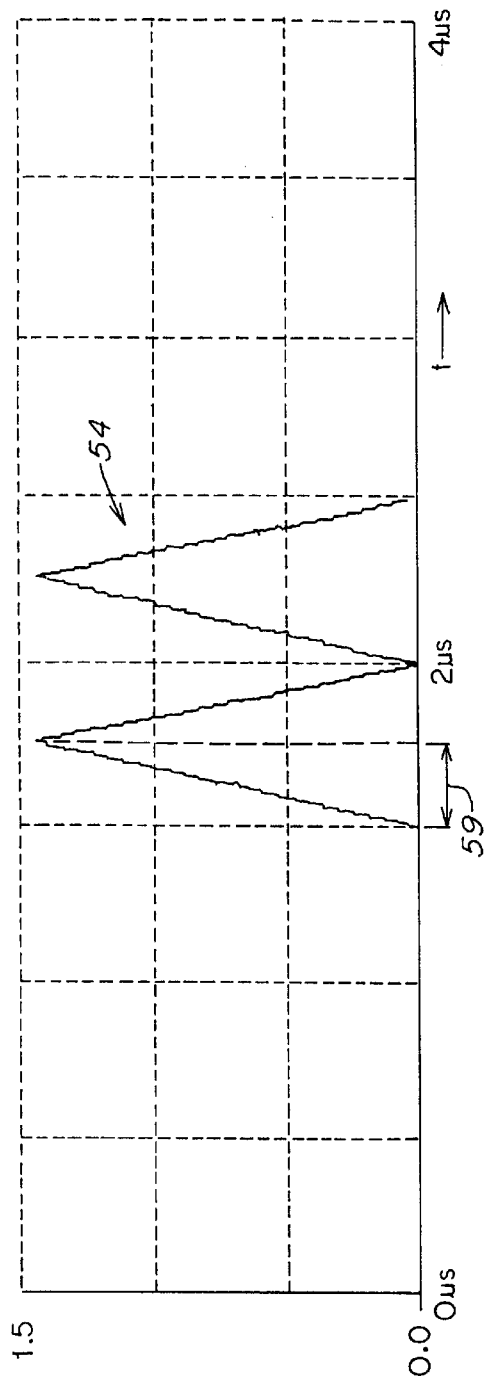
FIGS. 5A, 5B, 6A, and 6B are plots showing examples of ultrasound transmit waveforms according to one embodiment of the invention and the corresponding frequency spectra.

The concept of harmonic content of waveforms in general will now be discussed briefly with reference to FIGS. 3A–6C. FIGS. 3A and 3B through 6A and 6B are graphs which illustrate four examples of waveforms and their corresponding frequency spectra. For each of FIGS. 3A, 4A, 5A, and 6A, the horizontal axis of the graphs represents time in microseconds (μS), and the vertical axis represents waveform amplitude in arbitrary units. For each of FIGS. 3B, 4B, 5B, and 6B, the horizontal axis of the graph represents frequency in megahertz (MHz), and the vertical axis represents the relative strength of a particular frequency component of the waveform, or spectrum, in units of decibels (dB). While, for purposes of comparison, FIGS. 3A and 4A illustrate waveforms that are employed in known ultrasound imaging systems, FIGS. 5A and 6A show examples of ultrasound transmit waveforms according to the present invention, having an appreciably lower harmonic content than the waveforms of FIGS. 3A and 4A.

FIG. 3A shows a single square pulse waveform 50 having a pulse width 49 of approximately 0.5 microseconds. The pulse width 49 is chosen for purposes of illustration only, and is not intended to be limiting. According to fundamental principles of Fourier transformation of waveforms between the time domain and the frequency domain, the fundamental frequency of such a square pulse waveform 50 is approximately equal to the reciprocal of the pulse width 49. Accordingly, the square pulse waveform 50 has a fundamental frequency of approximately 1/0.5 microseconds, or 2 MHz.

Figure 3B:
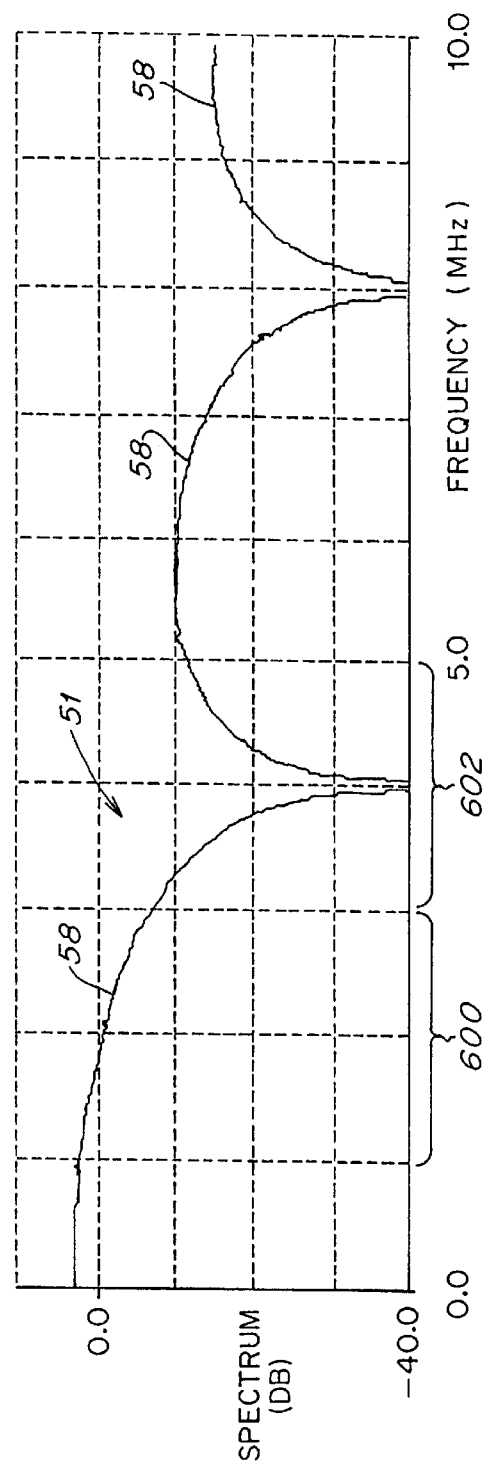

FIG. 3B shows a spectrum 51 in the frequency domain corresponding to the single square pulse waveform 50. The spectrum 51 illustrates the relative strengths of the various frequency components present in the single square pulse waveform 50. A portion or "band" of the spectrum 51 that includes the fundamental frequency of 2 MHz is indicated along the horizontal frequency axis of FIG. 3B by reference character 600. Similarly, a band of the spectrum 51 including the second harmonic of the fundamental frequency, namely, a frequency component at 4 MHz, is indicated along the horizontal frequency axis of FIG. 3B by reference character 602. In each of FIGS. 3B, 4B, 5B, and 6B, the widths of the bands 600 and 602 are chosen for purposes of illustration to be equal to the fundamental frequency of the example waveforms, namely 2 MHz.

The spectrum 51 of FIG. 3B comprises a plurality of sidelobes 58. In general, for Fourier transformation of waveforms from the time domain to the frequency domain, the relative strength of the sidelobes 58 decreases as the frequency difference from the fundamental frequency increases. Accordingly, the harmonic content, contained within the sidelobes 58 of a waveform, generally decreases with increasing frequency from the fundamental. More specifically, each waveform profile in time corresponds to a frequency spectrum having a particular distribution of sidelobes 58 with varying relative strengths. Hence, the harmonic content of a waveform is directly related to the shape or profile of the waveform as a function of time. As a result, a waveform profile may be chosen to achieve an appreciable reduction of harmonic content, or "sidelobe suppression," across the entire frequency spectrum, in one or more frequency bands of interest, or at or near a particular frequency of interest.

Using 0.0 dB as a reference for the spectra of FIGS. 3B, 4B, 5B, and 6B at the fundamental frequency of 2 MHz, FIG. 3B shows that the square pulse waveform 50 has a spectrum 51 with significant frequency components in the band 600 around the fundamental frequency of 2 MHz. However, spectrum 51 indicates that the harmonic content of square pulse waveform 50 is attenuated very near the second harmonic frequency of 4 MHz, and shows an absence of appreciable second harmonic content at 4 MHz. However, spectrum 51 nonetheless shows a significant harmonic content in the band 602 around the second harmonic frequency, and in particular, a harmonic content of approximately −10 dB near the frequencies 3.3 and 5 MHz.

FIG. 4A shows a plot of waveform 52 which includes two square pulses, each pulse having a pulse width 49 of approximately 0.5 microseconds. FIG. 4B shows the corresponding spectrum 53 for the waveform 52. As in FIG. 3B, a band of the spectrum 53 which includes the fundamental frequency 2 MHz is indicated by reference character 600, and a band of the spectrum 53 including the second harmonic frequency 4 MHz is indicated by reference character 602. As compared to the spectrum 51 of FIG. 3B, the spectrum 53 of FIG. 4B includes an increased number of sidelobes 58. Furthermore, the relative harmonic content of spectrum 53 in band 602 is notably decreased compared with that of the band 602 of spectrum 51. In particular, while the harmonic content of spectrum 51 in band 602 is as high as −10 dB or greater, the band 602 of spectrum 53 in FIG. 4B has a harmonic content of only up to approximately −15 dB or less, or a sidelobe suppression of approximately 15 dB or greater. Hence, the two-square-pulse waveform 52 has a low harmonic content around the second harmonic frequency compared with that of the single-square-pulse waveform 50.

Figure 5B:
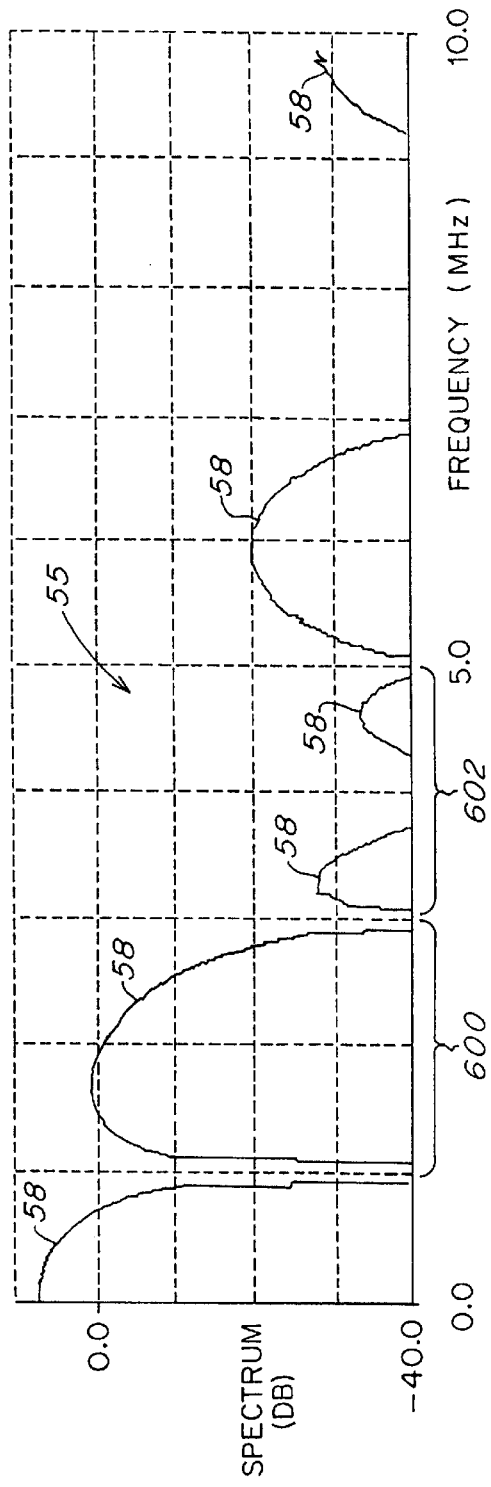
Figure 6A:
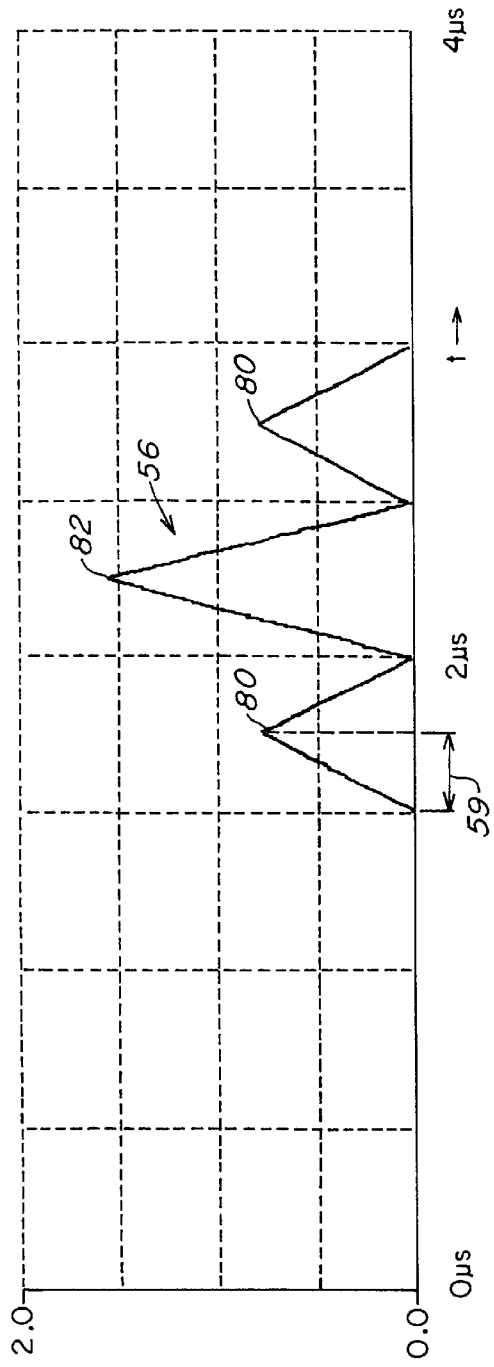

FIGS. 5 and 6 show time domain and frequency domain illustrations, similar to the plots of FIGS. 3 and 4, for two exemplary ultrasound transmit waveforms according to the invention having triangular shapes. FIG. 5A shows a waveform 54 including two triangle pulses, each pulse having a rise time 59 of approximately 0.5 microseconds. FIG. 5B shows the spectrum 55 corresponding to the waveform 54. The harmonic content of the spectrum 55 in the band 602 around the second harmonic frequency has a maximum relative strength of between −25 and −30 dB, or a sidelobe suppression of between 25 and 30 dB.

Figure 6B:
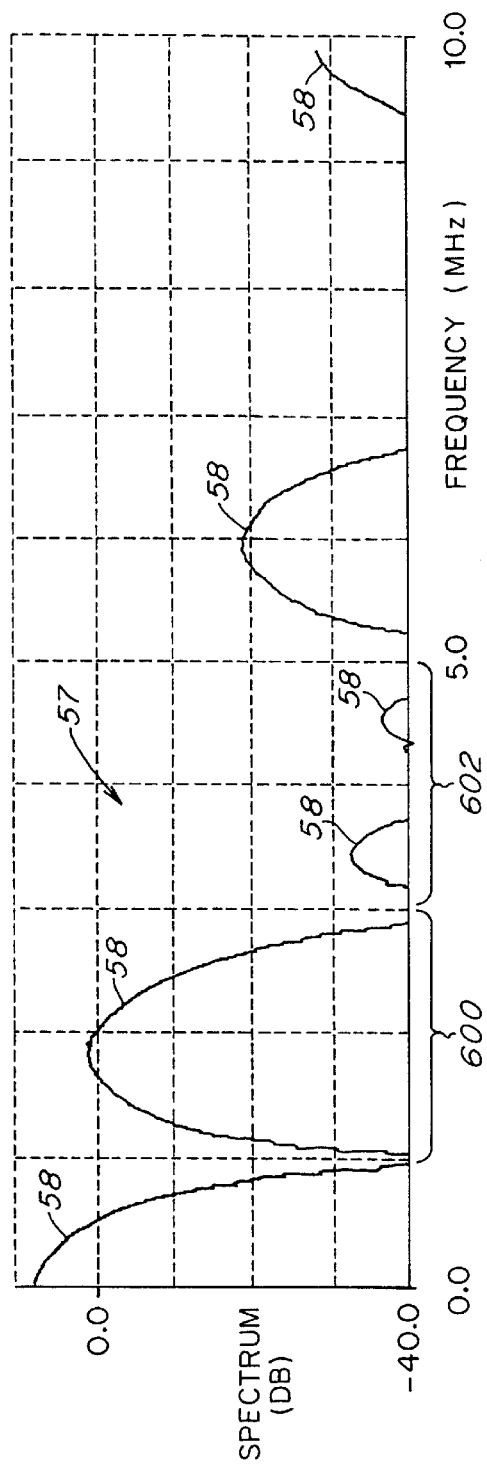

FIG. 6A shows a complex triangular waveform 56 having at least two unique maxima 80 and 82, including three triangle pulses, each pulse having a rise time 59 of approximately 0.5 microseconds. FIG. 6B shows a spectrum 57 corresponding to the waveform 56. The harmonic content of spectrum 57 in the band 602 around the second harmonic frequency has a relative strength of less than −30 dB, or a sidelobe suppression of greater than 30 dB. Hence, of the four example waveforms illustrated in FIGS. 3 through 6, waveform 56 shown in FIG. 6A has the most significantly low harmonic content, or the greatest sidelobe suppression, particularly around the second harmonic frequency.

It should be appreciated that while a particular time scale for the waveforms and corresponding frequency range for the spectra are given in the plots of FIGS. 3 to 6, a variety of waveform profiles according to the invention may be chosen to achieve sidelobe suppression, or low harmonic content in the spectra, over a variety of frequencies and ranges. For example, while predominantly triangular waveforms are illustrated in FIGS. 5A and 6A as low harmonic content waveforms according to the invention, a variety of trapezoidal shaped waveforms may also provide a suitably low harmonic content for purposes of the invention. The time scale, frequency range, and waveform shapes of FIGS. 5–6 are chosen for purposes of illustrating the general concepts of sidelobe suppression and reducing harmonic content of waveforms according to the invention, and are not intended to be limiting.

Figure 7:
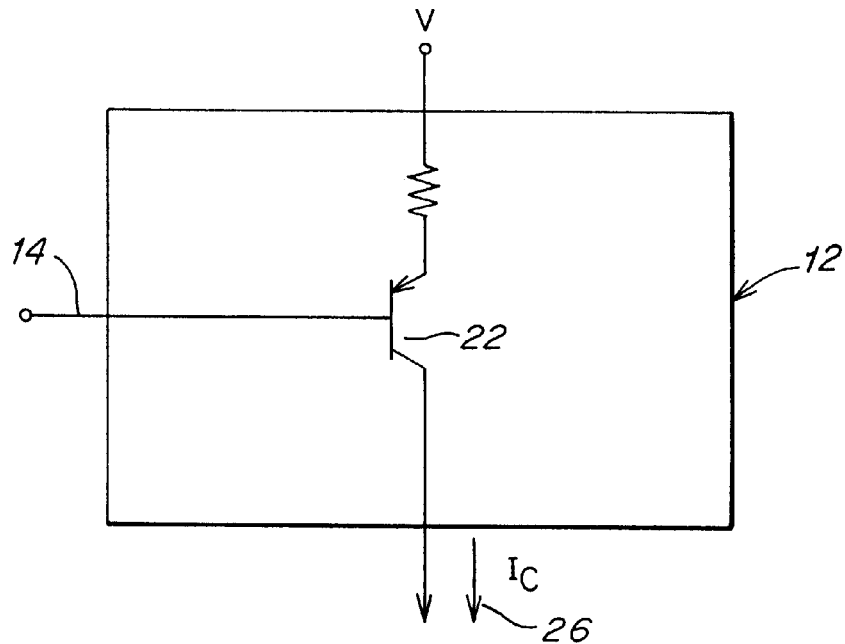
FIGS. 7 and 8 are circuit diagrams illustrating simple examples of the charge circuit shown in FIG. 2B.

Returning now to the apparatus shown in FIG. 2B having a current mode transducer driver, the charge circuit 12 and the discharge circuit 16 of the controllable switched current source transducer driver 20 may each include bipolar junction transistors (BJTS) or field effect transistors (FETs) as high impedance current sources to provide the charge current 26 and conduct the discharge current 28. FIG. 7 shows an example of the charge circuit 12 including a BJT 22 as a current source according to one embodiment of the invention, providing charge current 26 from the collector of the BJT, while FIG. 8 shows an example of the charge circuit 12 including an FET 24 as a current source according to one embodiment of the invention, providing charge current 26 from the drain of the FET.

Figure 8:
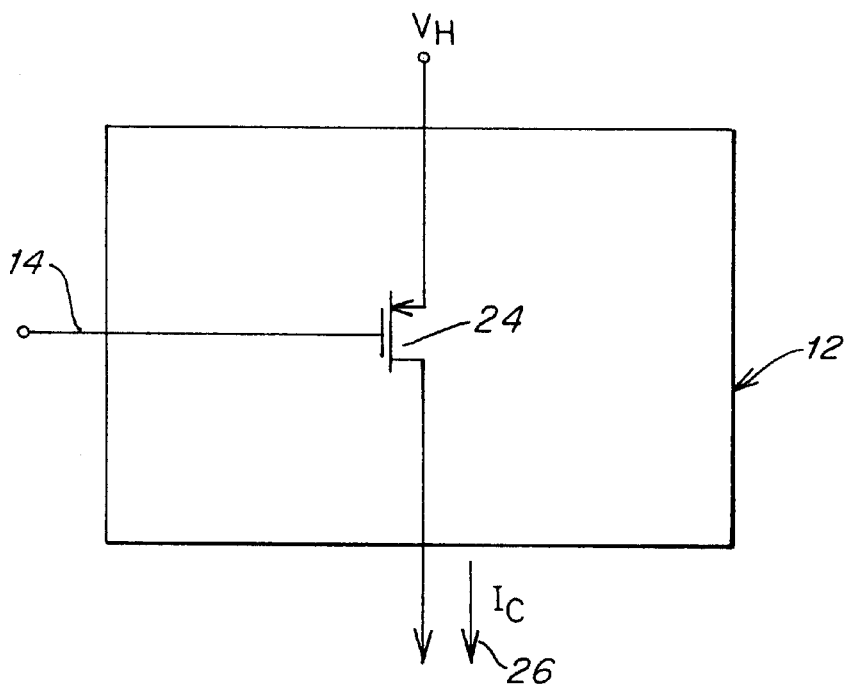

The BJT 22 or the FET 24 of FIGS. 7 and 8 may be high voltage devices, capable of withstanding voltages of between 25–100 volts. Additionally, while FIG. 7 shows only one BJT and FIG. 8 shows only one FET for the charge circuit 12, any number of BJTs or FETs, arranged in a variety of serial and/or parallel configurations, may be used for either the charge circuit 12 or the discharge circuit 16 to provide high impedance current terminations which approximate those of an ideal current source having a theoretically infinite impedance.

Figure 9:
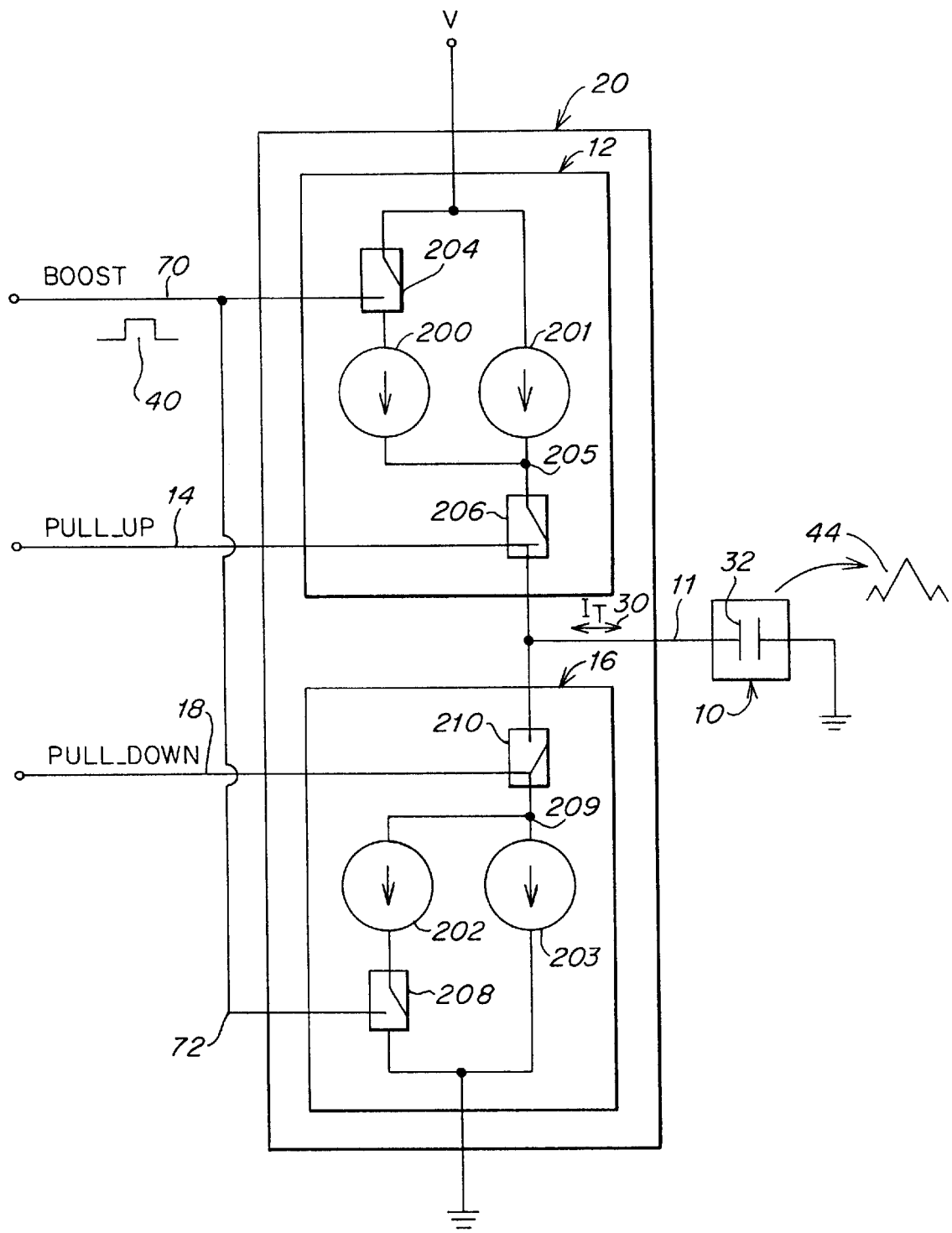
FIG. 9 is a diagram of an example of the apparatus of FIG. 2B according to one embodiment of the invention.

FIG. 9 is a diagram of an example of the controllable switched current source transducer driver 20 of the apparatus of FIG. 2B according to one embodiment of the invention. Unlike the linear filter 35 of FIG. 2A which employs a voltage mode transducer driver, the switched current source 20 of FIG. 9 essentially functions to "piece together" an electrical waveform across ultrasound transducer element 10, based on two or more different charge/discharge rates, or "slopes." In this manner, the switched current source 20 of FIG. 9 is particularly useful for generating an electrical waveform, and hence an ultrasound transmit waveform 44, similar to the triangular waveform 56 shown in FIG. 6A, which has at least two unique maxima and at least two different slope magnitudes.

In the switched current source 20 of FIG. 9, the charge circuit 12 includes current sources 200 and 201 having a common terminal 205, serving as the output of the current sources 200 and 201. This output is controlled by charge control input 14, shown symbolically in FIG. 9 as operating (opening and closing) a switch 206. Current source 200 additionally has a terminal controlled by a first auxiliary control input 70, shown symbolically in FIG. 9 as operating switch 204.

Similarly, the discharge circuit 16 of FIG. 9 includes current sources 202 and 203 having a common terminal 209 which is controlled by discharge control input 18, shown symbolically in FIG. 9 as operating switch 210. Current source 202 additionally has a terminal controlled by a second auxiliary control input 72, shown symbolically in FIG. 9 as operating switch 208. While FIG. 9 shows the first and second auxiliary control inputs 70 and 72 connected together to receive the same control signal, auxiliary control inputs 70 and 72 may be separate and may operate independently, receiving two or more distinct control signals.

The charge circuit 12 and discharge circuit 16 of FIG. 9 are electrically coupled to provide the drive current 30, and may be operated to output drive current 30 to the ultrasound transducer element 10 such that ultrasound energy having a wide variety of ultrasound transmit waveforms 44 is transmitted from the transducer element 10. For example, as discussed above in connection with FIG. 2B, the switched current source 20 of FIG. 9 may be operated by applying digital pulse control signals 40 such that at least one of the charge circuit 12 and the discharge circuit 16 outputs at least two different current values for the drive current 30. In particular, the digital pulse control signals 40 may be applied to the charge control input 14, the discharge control input 18, and the first and second auxiliary control inputs 70 and 72 in a predetermined manner, such that the drive current 30 produces an ultrasound transmit waveform 44 having at least two distinct slopes and at least two unique maxima, similar to the waveform shown in FIG. 6A.

Figure 10:
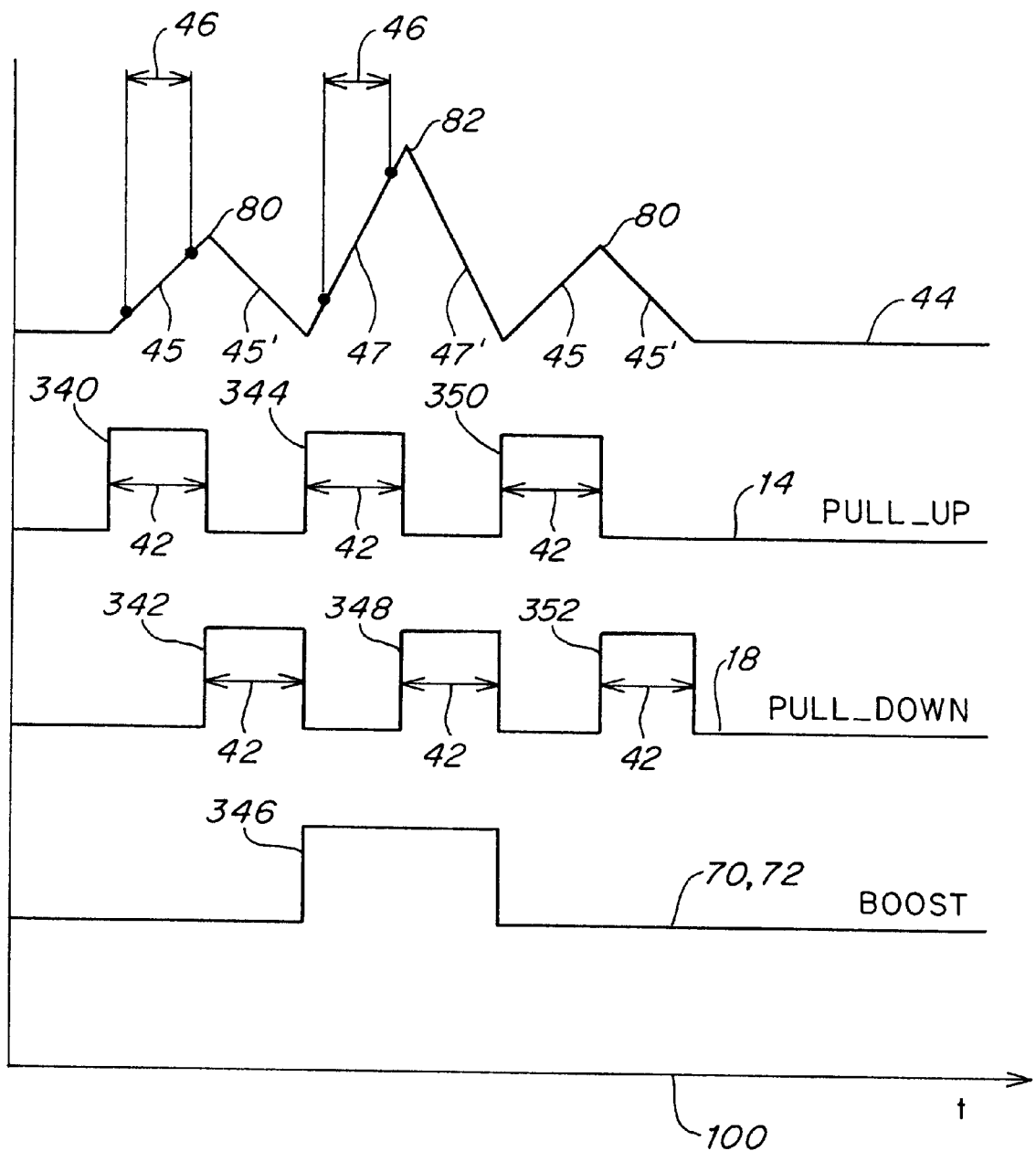
FIG. 10 is a graph illustrating a timing relationship between control signals applied to the apparatus of FIG. 9, according to one embodiment of the invention, and an ultrasound transmit waveform output by the apparatus.

FIG. 10 is a timing diagram of the digital pulse control signals applied to the switched current source 20 of FIG. 9 according to one embodiment of the invention, and the resulting electrical waveform generated across the ultrasound transducer element 10 and, hence, essentially the ultrasound transmit waveform 44 transmitted by the transducer element. The horizontal axis 100 of FIG. 10 indicates time t. The lower three plots of FIG. 10 illustrate the digital pulse control signals PULL_UP, PULL_DOWN and BOOST. As shown in FIGS. 9 and 10, in this embodiment the PULL_UP control signal is applied to the charge control input 14, the PULL_DOWN signal is applied to the discharge control input 18, and the BOOST signal is applied to the first and second auxiliary control inputs 70 and 72.

With reference to FIGS. 9 and 10, a first pulse 340 of the PULL_UP control signal closes switch 206 so that current source 201 charges ultrasound transducer element 10 during a "charge phase." As shown in FIG. 10, during pulse 340 the PULL_DOWN and BOOST control signals remain in a logic low state so that switches 204, 208, and 210 remain open. The ultrasound transducer element 10 charges for a time indicated by the pulse width 42 of pulse 340. The resulting ultrasound transmit waveform 44 has a rise time 46 comparable to the pulse width 42, and a slope 45 based on the capacitance 32 and the drive current 30, which at this point is provided only by current source 201. The waveform 44 reaches a first maximum value 80 after the rise time 46, at the end of pulse 340.

After pulse 340, the PULL_UP control signal changes to a logic low state, at which time pulse 342 of the PULL_DOWN signal is applied to discharge control input 18. As a result, switch 206 is opened and switch 210 is closed, so that current source 203 conducts current from the ultrasound transducer element 10 during a "discharge phase." In the example of FIG. 10, pulse 342 has a pulse width 42 similar to that of pulse 340, so that the slope 45' of ultrasound transmit waveform 44 during this discharge phase is substantially equal in magnitude but opposite in sign to the slope 45 during the charge phase of the ultrasound transducer element 10. While FIG. 10 shows similar pulse widths 42 for each of the pulses 340, 342, 344, 348, 350, and 352 of the PULL_UP and PULL_DOWN control signal, it should be appreciated that each of the control signal pulses may have a unique pulse width, which in turn determines a respective rise or fall time of a portion of the ultrasound transmit waveform 44.

Returning to the graph of FIG. 10, after pulse 342 the PULL_DOWN signal changes to a logic low state as pulse 344 of the PULL-UP signal is applied to charge control input 14. At this time, pulse 346 of the BOOST signal is applied to first and second auxiliary control input 70 and 72. While switch 210 is opened, switches 204 and 206 are both closed so that both of current sources 200 and 201 provide drive current 30 to the ultrasound transducer element 10. While pulse 344 has a pulse width 42 similar to that of pulses 340 and 342 in FIG. 10, the drive current 30 at this point is nonetheless greater than the drive current provided to, or drawn from, the ultrasound transducer element during the pulses 340 and 342, respectively, due to the two current sources 200 and 201 providing the drive current simultaneously. Accordingly, the magnitude of slope 47 of ultrasound transmit waveform 44 is greater than that of slope 45 as a result of the increased drive current, and hence, the magnitude of the ultrasound transmit waveform 44 reaches a higher maximum value 82 after substantially the same rise time 46.

Continuing with FIG. 10, while pulse 346 of the BOOST signal is still applied to first and second auxiliary control inputs 70 and 72, after pulse 344 the PULL_UP control signal subsequently changes to a logic low state and pulse 348 of the PULL_DOWN signal is applied to discharge control input 18. As a result, switch 206 is opened and switches 208 and 210 are closed, allowing both current sources 202 and 203 to draw current from ultrasound transducer element 10. During the assertion of pulse 348, the slope 47' of ultrasound transmit waveform 44 is substantially equal in magnitude but opposite in sign to the slope 47.

Following pulse 348, both of the PULL_DOWN and BOOST signals change to a logic low state, thereby opening switches 210, 204, and 208, while pulse 350 of the PULL_UP signal is applied to the charge control input 14, again closing switch 206, and allowing current source 201 to charge the ultrasound transducer element 10. Since only one current source 201 is charging ultrasound transducer element 10 as this point, the slope 45 of ultrasound transmit waveform 44 during pulse 350 is less than the slope 47 and is similar to the slope of waveform 44 during pulse 340. Following pulse 350, the PULL_UP signal changes to a logic low state, and pulse 352 of the PULL_DOWN signal is applied to discharge control input 18, thereby closing switch 210 and allowing current source 203 to discharge the ultrasound transducer element 10.

According to the digital pulse control sequence described above in the example of FIG. 10, a complex triangular ultrasound transmit waveform 44 is generated, having two distinct slope magnitudes 45 and 47 and at least two unique maxima 80 and 82, similar to the waveform shown in FIG. 6A. It should be appreciated that, while FIG. 9 shows two switched current sources for each of the charge and discharge circuits of controllable current source 20, any number of current sources and switches, controlled by any number of control inputs, may be employed in the charge circuit 12 and the discharge circuit 16, in a number of configurations, to "piece together" a wide variety of low harmonic content waveforms having several distinct slope magnitudes and unique maxima. Additionally, as discussed above, while FIG. 10 shows similar pulse widths for the control signals, a variety of pulse widths and sequences may be used for the control signals, in conjunction with the apparatus of FIG. 9 or similar apparatus employing a different number of current sources and/or differently configured control inputs, to generate a variety of low harmonic content waveforms.

Figure 11:
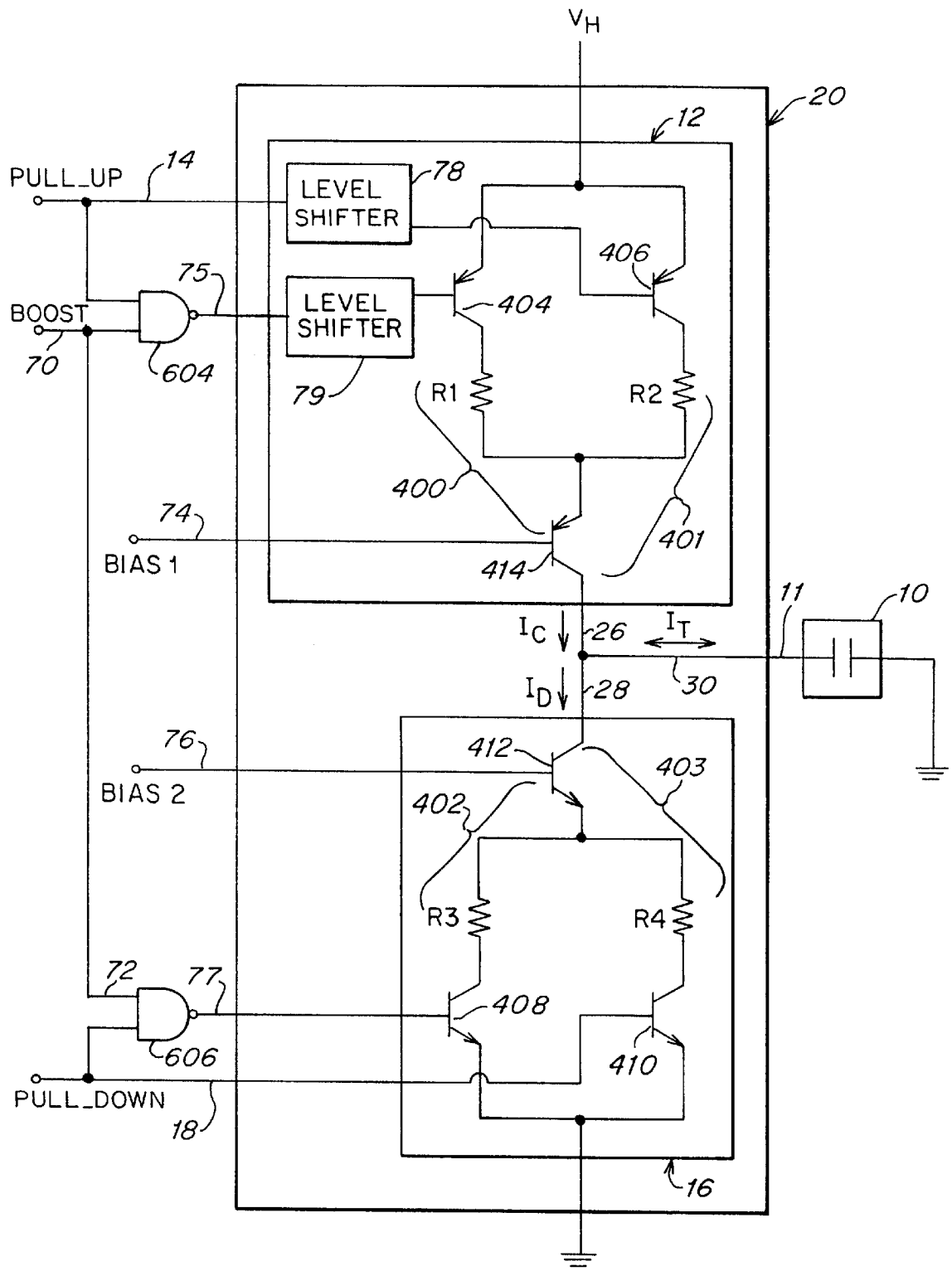
FIG. 11 is a detailed circuit diagram showing an example of the apparatus of FIG. 9 using bipolar junction transistors according to one embodiment of the invention.
Figure 12:
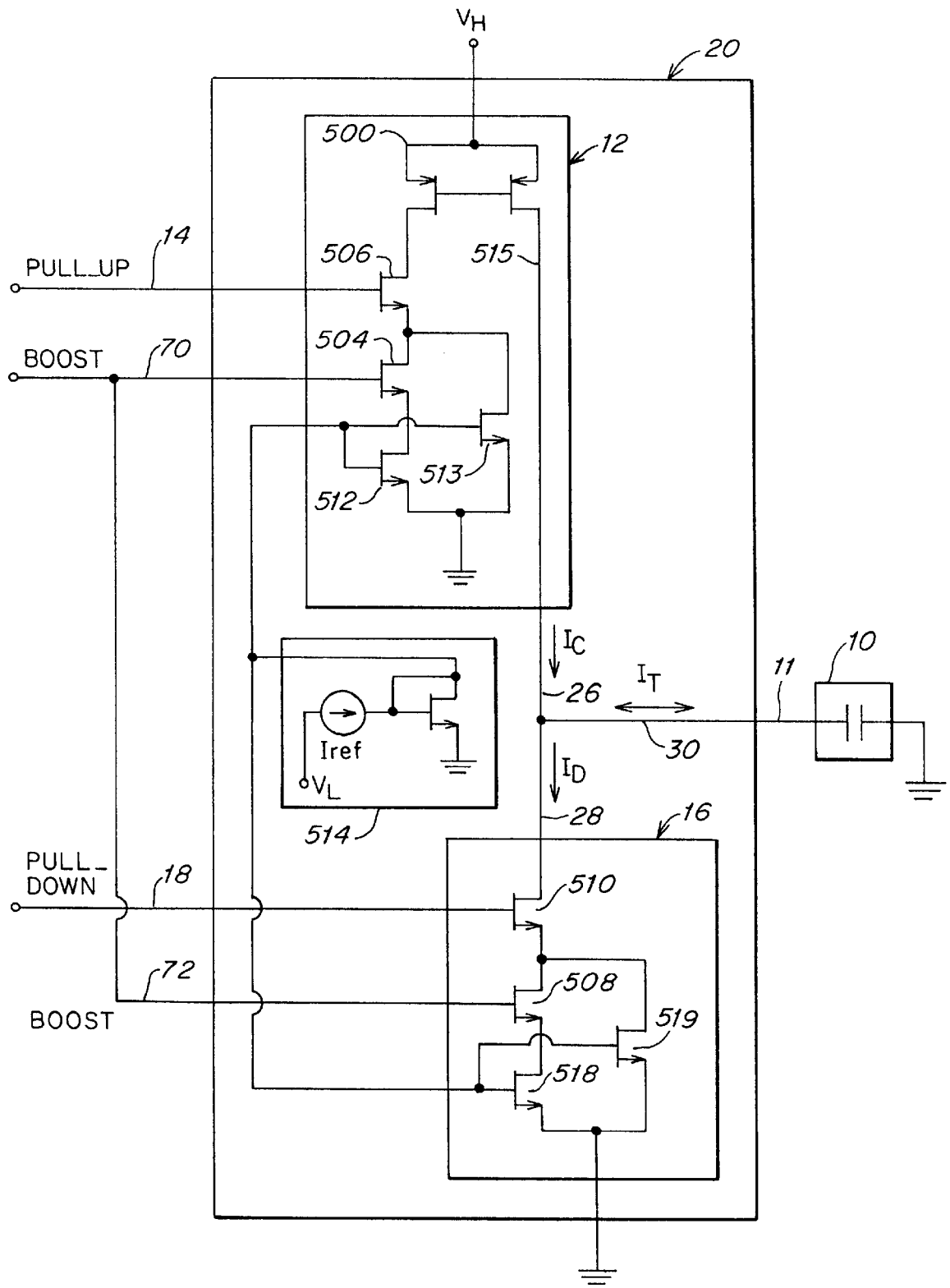
FIG. 12 is a detailed circuit diagram showing an example of the apparatus of FIG. 9 using FETs according to one embodiment of the invention.

FIGS. 11 and 12 each show a detailed circuit diagram of an example of the apparatus of FIG. 9 employing current mode transducer drivers according to one embodiment of the invention. The example of FIG. 11 uses BJTs and outputs the drive current 30 via collectors of BJTs, while the example of FIG. 12 uses FETs and outputs the drive current 30 via drains of FETs. As discussed above in connection with FIGS. 7 and 8, the collectors of BJTs and the drains of FETs provide high impedance current terminations which approximate those of an ideal current source having a theoretically infinite impedance.

In the circuit of FIG. 11, the BOOST control signal and the PULL_UP control signal, as shown in FIG. 10, are applied to logic AND gate 604 to provide a gated BOOST signal 75. Similarly, the BOOST control signal and the PULL_DOWN control signal, as shown in FIG. 10, are applied to logic AND gate 606 to provide gated BOOST signal 77. The charge circuit 12 of FIG. 11 includes two level shifters 78 and 79, two BJT switches 404 and 406, a first current source 400 comprising resistor R1 and BJT 414, and a second current source 401 comprising resistor R2 and BJT 414. The BJT switches 404 and 406 function similarly to the switches 204 and 206 of FIG. 9, while the current sources 400 and 401 function similarly to the current sources 200 and 201 of FIG. 9.

In the circuit of FIG. 11, level shifter 78 is coupled between charge control input 14 and BJT switch 406, and serves to shift the TTL logic level of the PULL_UP control signal to provide a switching current to the base of BJT switch 406 that is referenced to the supply voltage $V_H$ applied to the emitters of BJT switches 404 and 406. Similarly, level shifter 79 is coupled to receive the TTL logic level of the gated BOOST signal 75 and to provide a switching current to the base of BJT switch 404 that is referenced to the supply voltage $V_H$.

When the PULL_UP control signal applied to charge control input 14 is such that BJT switch 406 conducts current, the current source 401 provides charge current 26 from the collector of BJT 414. The charge current 26 provided by current source 401 is determined by the resistance value of resistor R2, the supply voltage $V_H$, and a bias voltage BIAS1 applied to the base 74 of BJT 414. It should be appreciated that a variety of resistor values may be selected for resistor R2 and the supply voltage $V_H$ and the BIAS1 signal may be varied to provide a variety of charge currents 26 depending on a particular application.

In a manner similar to that of current source 401, current source 400, which includes resistor R1 and BJT 414, may be controlled to provide current, in conjunction with current source 401, to output charge current 26. When both the PULL_UP control signal and the BOOST control signal are at a logic high level, the gated BOOST signal 75, via level shifter 79, causes BJT switch 404 to conduct current, hence activating current source 400. The charge current 26 is then the combined current contributions from current sources 400 and 401. As with current source 401, the current provided by current source 400 is determined by the resistance value of resistor R1, the supply voltage VH, and the BIAS1 signal applied to the base 74 of BJT 414. For many applications, the values of resistors R1 and R2 may be chosen to be equal.

The discharge circuit 16 of FIG. 11 functions similarly to charge circuit 12, as described above. In FIG. 11, discharge circuit 16 includes two BJT switches 408 and 410, which function similarly to switches 208 and 210, respectively, of FIG. 9. The base of BJT switch 408 is coupled to receive the gated BOOST signal 77, and the base of BJT switch 410 serves as the discharge control input 18 which receives the PULL_DOWN control signal. Current source 402 comprises resistor R3 and BJT 412, while current source 403 comprises resistor R4 and BJT 412. Current sources 402 and 403 function similarly to current sources 202 and 203, respectively, of FIG. 9. A BIAS2 signal is applied to the base 76 of BJT 412, and together with the supply voltage $V_H$ and the resistance values of resistors R3 and R4, determines the current drawn by each of the current sources 402 and 403, respectively. In the circuit of FIG. 11, the collector of BJT 414 and the collector of BJT 412 of the charge and discharge circuits, respectively, are coupled to provide the drive current 30. The switched current source 20 of FIG. 11 may be fabricated as a monolithic integrated circuit.

The circuit of FIG. 12 functions similarly to that of FIG. 11, but employs FETs rather than BJTs. In the charge circuit 12 of FIG. 12, FET current mirror 500 and FET 513 essentially function as current source 201 of FIG. 9, while current mirror 500 and FET 512 essentially function as current source 200 of FIG. 9. Reference current source 514, which is applied to the gates of FETs 512 and 513 in the circuit of FIG. 12, determines the magnitude of charge current 26. FET 506 corresponds to switch 206 of FIG. 9, while FET 504 essentially functions as switch 204 of FIG. 9, receiving the PULL_UP control signal and the BOOST control signal on their respective gates. The output 515 of current mirror 500 provides the charge current 26.

In the discharge circuit 16 of FIG. 12, FET 510 functions similarly to switch 210 of FIG. 9, wherein the gate of FET 510 serves as the discharge control input 18 which receives the PULL_DOWN control signal. FET 508 functions similarly to switch 208 of FIG. 9, wherein the gate of FET 508 serves as the second auxiliary control input 72 which receives the BOOST control signal. FET 519 functions similarly to current source 203 of FIG. 9, while FET and 518 functions similarly to current source 202 of FIG. 9. FETs 518 and 519 are biased at their gates by reference current source 514 which, similarly to the charge current 26, determines the magnitude of the discharge current 28. As a result, the magnitude of the reference current 514 determines an appropriate range of values for the charge current 26 and the discharge current 28, and hence, the drive current 30. As in the circuit of FIG. 11, the switched current source 20 of FIG. 12 may be fabricated as a monolithic integrated circuit.

Figure 13:
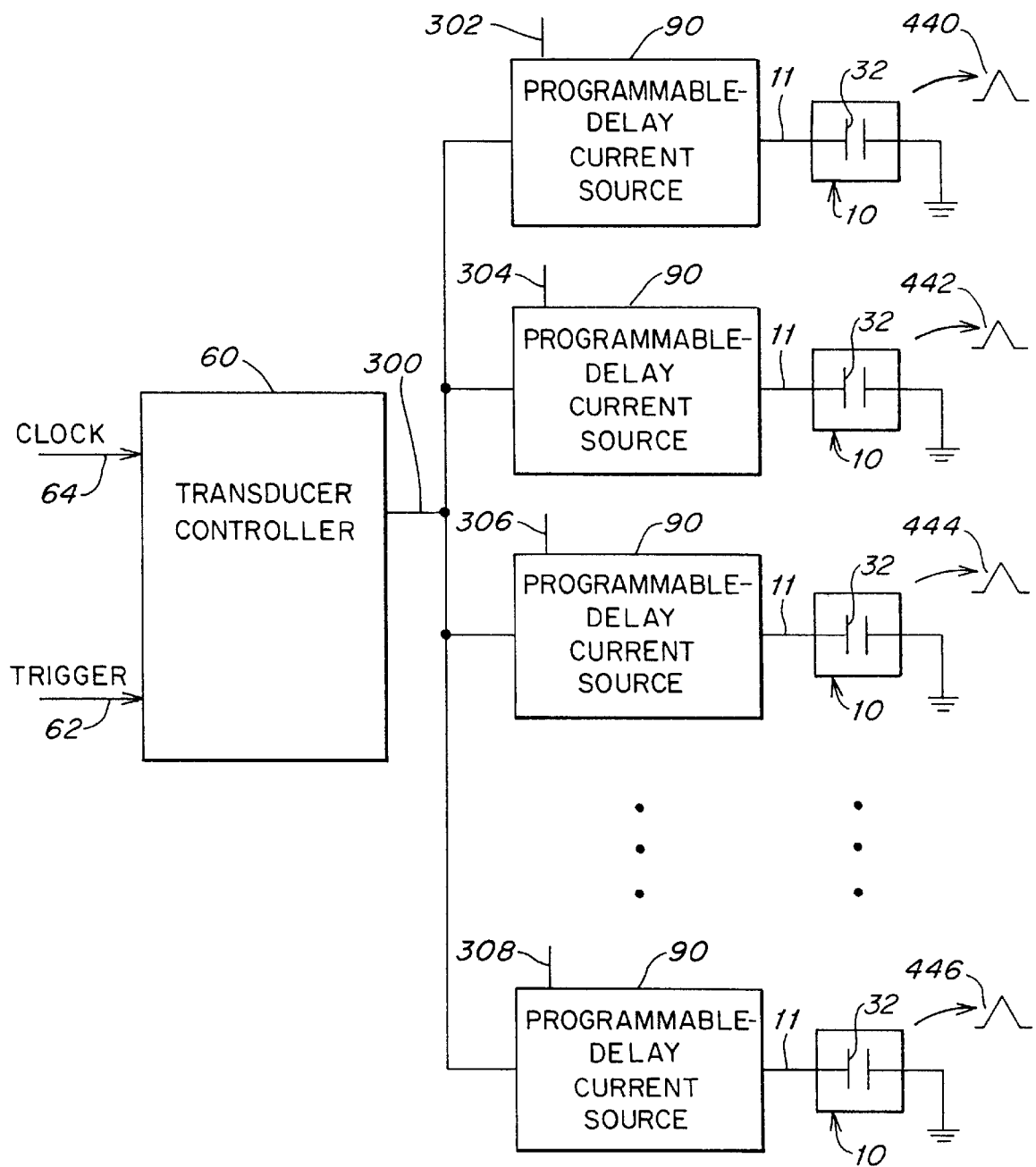
FIG. 13 is a block diagram of an apparatus for controlling a number of ultrasound transducer elements to transmit ultrasound energy having a low harmonic content according to one embodiment of the invention.

While the foregoing discussion has been directed primarily to an ultrasound transmit waveform generated by a single ultrasound transducer element, the method and apparatus of the invention may be effectively implemented to provide an ultrasound transmit waveform having low harmonic content from a number of ultrasound transducer elements. FIG. 13 is a block diagram of an apparatus for controlling a number of ultrasound transducer elements to transmit ultrasound energy having low harmonic content, according to one embodiment of the invention.

The apparatus of FIG. 13 includes a plurality of ultrasound transducer elements 10, each transducer element having a capacitance 32. While in practice the respective capacitances 32 of the transducer elements 10 may not be precisely equal, substantially similar capacitances are assumed, which is suitable for purposes of the invention. Additionally, as discussed above in connection with FIG. 2A, the capacitance 32 is assumed, for purposes of discussion, to include any interconnection capacitance due to the signal conductors 11. Programmable delay current sources 90 charge and discharge the ultrasound transducer elements 10 via the signal conductors 11 in a selectable manner. Each programmable delay current source 90 charges and discharges a respective ultrasound transducer element 10 so as to transmit ultrasound energy having an ultrasound transmit waveform, shown in FIG. 13 as waveforms 440, 442, 444 and 446 for respective transducer elements 10, wherein the ultrasound transmit waveform has a low harmonic content based on the capacitance 32.

The apparatus of FIG. 13 may further include a transducer controller 60 to output common control signals 300 to the plurality of programmable delay current sources 90. The ultrasound transmit waveforms 440, 442, 444, and 446 transmitted by each transducer element 10 are based on selectably delayed versions of the common control signals 300. The common control signals 300 may be, for example, digital pulse control signals similar to those described above in connection with FIGS. 9 and 10. One example of a transducer controller 60 suitable for purposes of the invention includes, but is not limited to, a synchronous state machine which receives a clock signal 64 and a trigger signal 62, and generates one or more digital pulses in a predetermined timing sequence as the common control signals 300.

Figure 14:
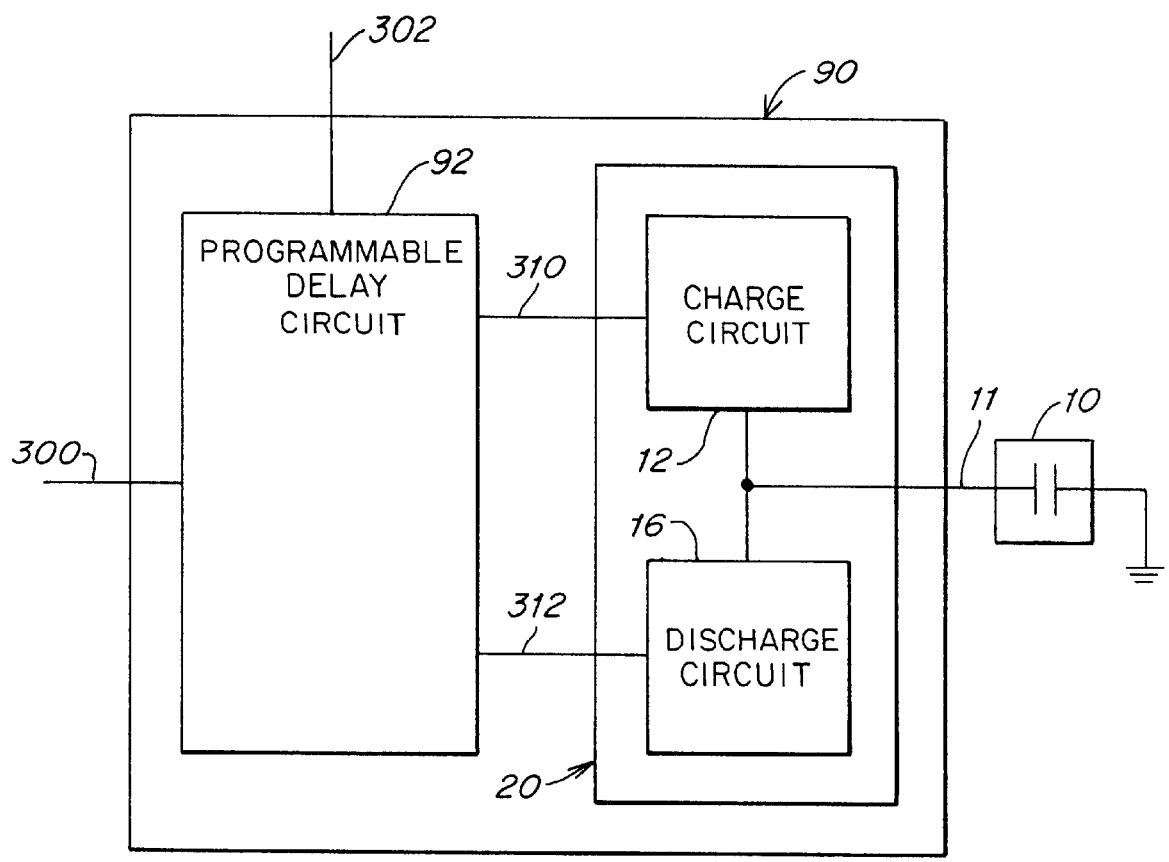
FIG. 14 is a block diagram of a programmable delay current source of the apparatus of FIG. 13.

FIG. 14 is a block diagram of an example of one programmable delay current source 90 of the apparatus of FIG. 13. Each programmable delay current source 90 may comprise a switched current source 20 that includes a charge circuit 12 to charge a respective transducer element 10, and a discharge circuit 16 to discharge the respective transducer element. Each current source 90 may additionally include at least one programmable delay circuit 92 to receive the common control signals 300 and delay instruction signals 302 and to output selectively delayed versions 310 and 312 of the common control signals 300 to the charge circuit 12 and the discharge circuit 16, based on the delay instruction signals 302.

With reference again to FIG. 13, each programmable delay current source 90 may receive unique delay instructions signals 302, 304, 306, and 308, so that the respective ultrasound transmit waveforns 440, 442, 444 and 446 output by the ultrasound transducer elements 10 have similar waveform profiles but are delayed with respect to one another in time. By selectively delaying the common control signals 300, the apparatus of FIG. 13 allows a waveform of ultrasound energy transmitted by a plurality of transducer elements to be steered and/or focused to a particular region of interest.

In FIG. 14, the switched current source 20, including charge circuit 12 and discharge circuit 16, may be similar to any one of the circuits discussed in connection with FIGS. 2, 9, 11, or 12. While FIG. 14 shows two selectively delayed versions 310 and 312 of the common control signals 300 coupled to the charge circuit 12 and the discharge circuit 16, respectively, any number of selectively delayed control signals may be provided by the programmable delay circuit 92 and applied to either one or both of the charge circuit 12 and the discharge circuit 16 to operate the controllable current source 20. Additionally, with reference again to FIG. 13, the programmable delay current sources 90 and the transducer controller 60 may be fabricated as a monolithic integrated circuit.

Figure 15:
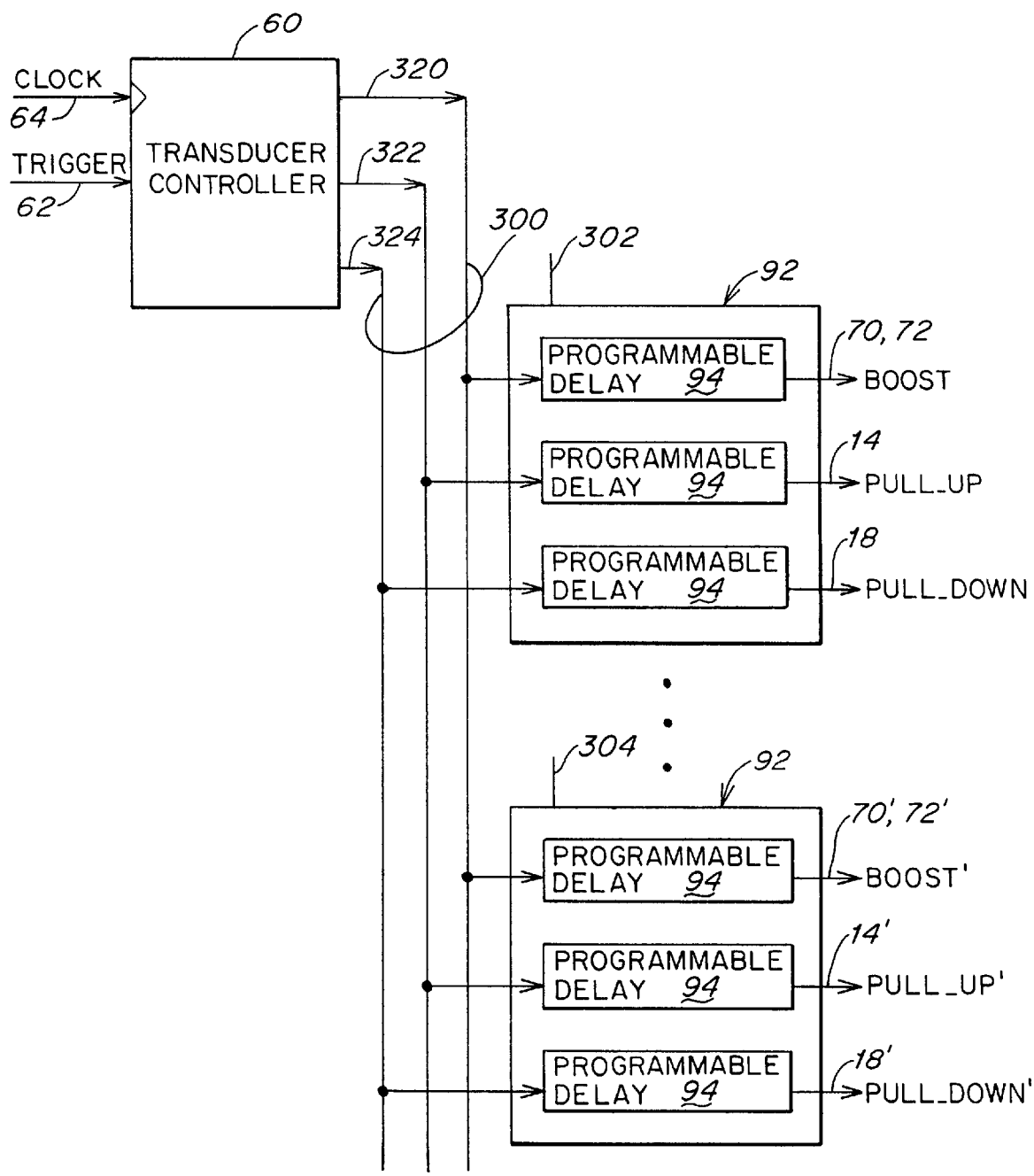
FIG. 15 is a detailed block diagram of a portion of the apparatus of FIG. 13.

FIG. 15 is a more detailed block diagram of a portion of the circuit of FIG. 13, constructed and arranged to provide ultrasound transmit waveforms from a plurality of transducer elements in a manner similar to that described in connection with FIGS. 9 and 10 for a single ultrasound transducer element. More specifically, the apparatus of FIG. 15 may be utilized to provide a complex triangular ultrasound transmit waveform having at least two distinct slope magnitudes and at least two unique maxima from a plurality of transducer elements.

In FIG. 15, common control signals 300 include signals 320, 322, and 324, output from transducer controller 60. Each signal 320, 322, and 324 is applied to a respective programmable delay 94 in the programmable delay circuit 92 of current source 90 (FIG. 13) for each ultrasound transducer element. Each programmable delay circuit 92 receives delay instruction signals as described above in connection with FIGS. 13 and 14, shown in FIG. 15 as signals 302 and 304, and outputs selectively delayed versions of the common control signals 320, 322, and 324 based on the delay instruction signals. While FIG. 15 shows only two programmable delay circuits 92 receiving delay instruction signals 302 and 304, respectively, any number of programmable delay circuits 92 may be utilized, as determined by the number of ultrasound transducer elements employed in the ultrasound imaging system. Furthermore, the delay instruction signals for each programmable delay circuit 92 may or may not be unique, and depends on the manner in which ultrasound energy is to be directed by the transducer elements.

In FIG. 15, the selectively delayed versions of the common control signals 300 output by the programmable delay circuits 92 correspond to the BOOST, PULL_UP and PULL_DOWN signals shown in FIGS. 9 and 10. In the apparatus of FIG. 15, the outputs of programmable delay circuits 92 are labeled, for purposes of illustration, with reference characters 14, 18, 70, and 72, and 14', 18', 70', and 72', respectively, to correspond to the charge control input, the discharge control input, and the first and second auxiliary control inputs of the circuit of FIG. 9 for two of the ultrasound transducer elements shown in FIG. 13. In practice, the apparatus of FIG. 15 may generate a selectively delayed version of the BOOST, PULL_UP and PULL_DOWN control signals for each ultrasound transducer element of an imaging system so that a waveform of ultrasound energy having low harmonic content may be directed by the ultrasound transducer elements into a region of interest.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting.

What is claimed is:

1. Apparatus comprising:
    an ultrasound transducer element to output ultrasound energy having an ultrasound transmit waveform with a low harmonic content, the ultrasound transducer element having a capacitance; and
    an analog transducer driver to charge and discharge the ultrasound transducer element based on at least one drive signal input to the analog transducer driver, the at least one drive signal having a fundamental frequency,
    wherein the analog transducer driver charges and discharges the ultrasound transducer element such that the ultrasound transmit waveform has a rise time based on the capacitance and one of an output impedance of the analog transducer driver and a drive current output by the analog transducer driver, the one of the output impedance and the drive current being selected such that the rise time is greater than one-fifth of a period given by a reciprocal of the fundamental frequency.

2. The apparatus of claim 1, wherein the fundamental frequency is less than 3.5 MHz.

3. The apparatus of claim 1, further including receive circuitry to detect a reflected ultrasound waveform at a harmonic frequency of the fundamental frequency.

4. The apparatus of claim 1, wherein:
    the drive signal has a drive signal harmonic content; and
    the low harmonic content is substantially less than the drive signal harmonic content.

5. The apparatus of claim 1, further including at least one signal conductor electrically connected to the ultrasound transducer element and the analog transducer driver, wherein:
    the at least one signal conductor has an interconnection capacitance;
    the interconnection capacitance and the capacitance of the ultrasound transducer element form a combined capacitance; and
    the rise time is based on the combined capacitance and the one of the output impedance and the drive current.

6. The apparatus of claim 5, wherein:
    the analog transducer driver comprises a controllable voltage source having the output impedance;
    the controllable voltage source and the ultrasound transducer element form a filter having a cutoff frequency based on the combined capacitance and the output impedance; and
    the output impedance is selected such that the cutoff frequency is less than a predetermined harmonic frequency of the fundamental frequency.

7. The apparatus of claim 6, wherein the predetermined harmonic frequency is the second harmonic frequency.

8. The apparatus of claim 5, wherein:
    the analog transducer driver comprises a controllable switched current source including at least one of a charge circuit and a discharge circuit to output the drive current to the ultrasound transducer element based on the drive signal; and
    the drive signal includes digital pulse control signals to control at least one of the charge circuit and the discharge circuit.

9. The apparatus of claim 8, wherein the ultrasound transmit waveform is a substantially triangular waveform.

10. The apparatus of claim 8, wherein the charge circuit and the discharge circuit each include a high-voltage bipolar junction transistor.

11. The apparatus of claim 8, wherein the charge circuit and the discharge circuit each include a high-voltage FET.

12. The apparatus of claim 8, wherein the digital pulse control signals control the controllable switched current source such that at least one of the charge circuit and the discharge circuit outputs at least two different current values for the drive current.

13. The apparatus of claim 12, wherein:
    the charge circuit comprises a plurality of first current sources having a first common terminal controlled by a charge control input, at least one of the first current sources having a second terminal controlled by a first auxiliary control input;
    the discharge circuit comprises a plurality of second current sources having a first common terminal controlled by a discharge control input, at least one of the second current sources having a second terminal controlled by a second auxiliary control input; and
    the digital pulse control signals are applied to the charge control input, the discharge control input, the first auxiliary control input, and the second auxiliary control input in a predetermined manner to control the plurality of first controllable current sources and the plurality of second controllable current sources to output the drive current.

14. The apparatus of claim 13, wherein the ultrasound transmit waveform comprises at least a first slope and a second slope, the first and second slopes being based on the combined capacitance and the drive current, the first slope having a different magnitude than the second slope.

15. The apparatus of claim 14, wherein the ultrasound transmit waveform comprises at least two unique maxima.

16. The apparatus of claim 13, wherein the controllable current source is fabricated as a monolithic integrated circuit.

17. Apparatus comprising:

a plurality of ultrasound transducer elements, each transducer element having a transducer impedance based on a capacitance of the transducer element;

a corresponding plurality of programmable-delay switched analog current sources to charge and discharge the plurality of ultrasound transducer elements in a selectable manner, each programmable-delay current source outputting a drive current to charge and discharge a respective ultrasound transducer element so as to transmit ultrasound energy having an ultrasound transmit waveform based on the drive current and the transducer impedance, wherein the ultrasound transmit waveform has a low harmonic content; and a transducer controller to output common control signals to the plurality of programmable-delay current sources, the ultrasound transmit waveform transmitted by each transducer element being based on selectably delayed versions of the common control signals.

18. The apparatus of claim 17, wherein the ultrasound transmit waveform is a substantially triangular waveform.

19. The apparatus of claim 17, wherein each programmable-delay current source comprises:

a charge circuit to charge the respective transducer element;

a discharge circuit to discharge the respective transducer element; and at least one programmable delay circuit to receive the common control signals and delay instruction signals, and to output the selectably delayed versions of the common control signals to the charge circuit and the discharge circuit, based on the delay instruction signals.

20. The apparatus of claim 17, wherein the plurality of programmable-delay current sources and the transducer controller are fabricated as a monolithic integrated circuit.

21. A method for transmitting ultrasound energy having a low harmonic content ultrasound transmit waveform, comprising steps of:

using an analog drive circuit, charging and discharging an ultrasound transducer element using one of a drive voltage applied to the ultrasound transducer element through a drive impedance and a drive current, the drive voltage and the drive current each having a fundamental frequency, the ultrasound transducer element having a capacitance; and selecting one of the drive impedance and the drive current such that the ultrasound transmit waveform has a rise time greater than one-fifth of a period given by a reciprocal of the fundamental frequency, the rise time being based on the capacitance and the one of the drive impedance and the drive current.

22. The method of claim 21, wherein the step of charging and discharging comprises a step of charging and discharging the ultrasound transducer element such that the ultrasound transmit waveform is a complex waveform comprising a sequence of three triangular pulses, wherein:

a first and last triangular pulse of the sequence each has a first slope magnitude and a first maximum; and a middle triangular pulse of the sequence, occurring between the first and last triangular pulses, has a second slope magnitude greater than the first slope magnitude and a second maximum greater than the first maximum.

23. The method of claim 21, wherein:

the step of charging and discharging comprises a step of applying digital pulse control signals having a pulse width to a switched current source to output the drive current, such that the ultrasound transmit waveform has a slope based on the capacitance and the drive current, and the rise time is comparable to the pulse width.

24. The method of claim 23, wherein a first magnitude of the low harmonic content of the ultrasound transmit waveform is at least 20 decibels below a second magnitude of a drive current harmonic content of the drive current in a frequency band around a second harmonic frequency of the fundamental frequency.

\* \* \* \* \*